US009356684B2

(12) United States Patent
Re et al.

(10) Patent No.: US 9,356,684 B2
(45) Date of Patent: May 31, 2016

(54) UPLINK POWER CONTROL METHOD AND APPARATUS FOR SATELLITE COMMUNICATIONS NETWORKS

(75) Inventors: Emiliano Re, JX Leiden (NL); Javier Perez Trufero, Palma de Mallorca (ES)

(73) Assignee: Agence Spatiale Europeenne, Paris (FR)

(*) Notice: Subject to any disclaimer, the term of this patent is extended or adjusted under 35 U.S.C. 154(b) by 0 days.

(21) Appl. No.: 14/416,196

(22) PCT Filed: Jul. 24, 2012

(86) PCT No.: PCT/IB2012/002918
§ 371 (c)(1),
(2), (4) Date: Jun. 5, 2015

(87) PCT Pub. No.: WO2014/016638
PCT Pub. Date: Jan. 30, 2014

(65) Prior Publication Data
US 2015/0270891 A1  Sep. 24, 2015

(51) Int. Cl.
  *H04B 7/00* (2006.01)
  *H04B 7/185* (2006.01)
  *H04W 52/14* (2009.01)

(52) U.S. Cl.
  CPC ......... *H04B 7/18513* (2013.01); *H04W 52/146* (2013.01)

(58) Field of Classification Search
  CPC .......... H04B 7/18523; H04B 7/18528; H04B 7/18521; H04B 7/1853
  USPC .................................. 455/69, 522, 506, 63.1
  See application file for complete search history.

(56) References Cited

U.S. PATENT DOCUMENTS

| | | | |
|---|---|---|---|
| 4,731,866 | A | 3/1988 | Muratani et al. |
| 4,752,967 | A | 6/1988 | Bustamante et al. |
| 4,941,199 | A | 7/1990 | Saam |
| 7,043,200 | B2 | 5/2006 | Andenæs |
| 7,599,657 | B2 | 10/2009 | Schiff |
| 7,925,211 | B2 | 4/2011 | Agarwal et al. |
| 2009/0190491 | A1* | 7/2009 | Miller ................ H04B 7/18513 370/252 |

FOREIGN PATENT DOCUMENTS

DE  10 2010 018944 A1  11/2011
EP  0 772 317 A2  5/1997

OTHER PUBLICATIONS

International Search Report and Written Opinion for Application No. PCT/IB2012/002918 dated Apr. 9, 2013.
ITU-R P.618-10 *Propagation data and production methods required for the design of Earth-space telecommunication systems*, (Oct. 2009).
Castenet, L. t al., *Interface and fade mitigation techniques for Ka and Q/V band satellite communication systems*, International Workshop Satellite Communications from Fade Mitigation to Service Provision, Noordwijk, The Netherlands (May 2003).
Lyons, R., *A Statistical Analysis of Transmit Power control to Compensate Up- and Down-Link Fading in an FDMA Satellite Communications System*, IEEE Transactions on Communications, vol. 24, Issue 6 Digital Object Identifier: 10.1109/TCOM.1976.1093346 (1976) pp. 622-636.
Mignolo, D. et al., *Approaching Terabit/s satellite; a system analysis*, Kaband Conference, Palermo, Italy (2011).
Thomas, L.D., *Power control on satellite uplinks*, U.S. Pat. No. 4,038,699, issue date: Jul. 26, 1977.

* cited by examiner

*Primary Examiner* — Tu X Nguyen
(74) *Attorney, Agent, or Firm* — Alston & Bird LLP

(57) ABSTRACT

An Uplink Power Control method of adjusting an operating point of a High-Power Amplifier (HPA) of a ground-to-satellite emitter (GWj, GWk, GWl) as a function of propagation attenuation, characterized in that the method includes the steps of: a) determining an optimal Output Back Off value of the High-Power Amplifier which, for an operational propagation attenuation level, maximizes a Signal over Noise plus total interference ratio at the satellite taking into account contributions from cochannel and cross-polar interferences, intermodulation interferences and thermal noise; and b) setting the operating point of the High-Power Amplifier at the optimal Output Back Off value. A ground-to-satellite emitter comprising a High-Power Amplifier (HPA), a control means (PROC) for adjusting an operating point of said High-Power Amplifier by carrying out such a method.

13 Claims, 26 Drawing Sheets

UPLINK POWER CONTROL METHOD AND APPARATUS FOR SATELLITE COMMUNICATIONS NETWORKS

FIELD

The invention relates to a method of performing Uplink Power Control of a ground-to-satellite emitter, and to a ground-to-satellite emitter for implementing such a method. The invention applies in particular to feeder links of Satellite Multibeam Broadband (fixed and Mobile) Communication systems with star topology, in which case the ground-to-satellite emitter is a gateway emitter. It can also apply to the uplinks of terminals in satellite communication networks with mesh topology.

BACKGROUND

Future Broadband Satellite Communication Systems are targeting to approach the Terabit per second aggregated capacity [RD 1]. This target can be achieved thanks to the extensive reuse of frequency in multibeam systems. The deriving aggregated bandwidth is therefore extremely large, implying the deployment of a large network of Gateways, which is very costly.

A possible way forward to reduce the number of gateways required, and therefore minimise the ground segment cost, is the exploitation of higher frequency bands (e.g. Q/V band) where larger chunks of bandwidths are available.

As an instance, in Europe 4 GHz are available in Q/V band, against the 2 GHz in Ka band. The factor of 2 in the available bandwidth directly translates in halving the number of gateways required, therefore halving also the ground segment cost.

Moving the feeder link towards higher frequency bands such as Q/V band though is not costless. The impact of the atmospheric phenomena is much more critical than in Ka in terms of attenuation undergone by the signal when clouds or rain are present. An example comparing the total atmospheric attenuation (in dB) not exceeded for 99.9% of the time in the average year at 30 GHz (Ka band) and 50 GHz (V band) is shown in FIG. 1(a) and FIG. 1(b) respectively. The values are computed according to [RD 2]. As it can be seen from the figures, on the Feeder Uplink (forward link) the Atmospheric attenuation is <20 dB for 99.9% of the time in Ka (30 GHz), whereas in Q/V (50 GHz) it increases up to 45-50 dB.

The large fade dynamic at these frequencies though risks jeopardising the availability of the link itself whenever a meteorological phenomena such as rain occurs. The large fade dynamic requires system designers to modify some common techniques for mitigate fading events. Such techniques are commonly known as Fade Mitigation Techniques (FMT).

Uplink power control is a Fade Mitigation Technique which has been widely studied since the early 1970s, and which consists in changing the output power of a High Power Amplifier (HPA) to modify the transmitted power in order to achieve a given result.

In satellite communications, Uplink Power Control in fixed links at high frequencies (i.e. Ku or higher) has been traditionally applied in such a way to compensate all the extra attenuation due to an atmospheric phenomena with respect to the nominal attenuation experienced by the signal in clear sky [RD 10].

The system architecture of a multibeam star network is shown in FIG. 2. Every gateway (GWj, GWi, GWk) deployed within the service area serves a subset of the User Beams. Every gateway transmits typically in the full bandwidth allocated to feeder links, and possibly on two orthogonal polarizations to minimise the required number of gateways required by the system thus reducing the ground segment cost. $L_{prop,CS}$ denotes the clear sky propagation attenuation.

The gateways can reuse the same frequency thanks to spatial isolation of the multibeam feeder link antenna. Anyway, due to imperfect isolation, some co-channel interference will still be present on the link.

FIG. 3 instead shows the case where one of the gateways is under fading conditions due for instance to a rain event. $L_{prop,A}$ denotes the propagation attenuation in these non-clear sky conditions.

In clear sky, on the transmission side the output power $P_{out}(i)$ transmitted by the gateway i is given by:

$$P_{out}(i) = P_{sat} - OBO_{eff}(i), \quad (1)$$

where $P_{sat}$ is the Saturated Power of the Gateway HPA and $OBO_{eff}(i)$ is the Output BackOff of gateway i.

The received power at the satellite in clear sky $C_{CS}(i)$ will be given then by:

$$C_{CS}(i)[dB] = EIRP_{sat}[dBW] - OBO_{eff}(i)[dB] - L_{prop,CS}(i)[dB] + Rx\_G_{i,i}[dBi], \quad (2)$$

where $L_{prop,CS}(i)$ is the propagation losses of the signal transmitted by gateway i and $Rx\_G_{i,i}$ is the gain of the antenna beam i towards gateway i.

When a fading event occurs in the feeder link, without power control the received signal power at the satellite becomes:

$$C_A(i)[dB] = C_{CS}(i)[dB] - A. \quad (3)$$

The Co-channel Interference of the gateway i is due to the portion of the power transmitted by the other gateways (k and j in FIG. 2) and received by beam i. The C/I cochannel in clear sky can be therefore quantified as:

$$(C/I_{co-channel})_{CS}(i)[dB] = C_{CS}(i)[dB] - (C_{CS}ij[dB] + C_{CS}ik[dB]) \quad (4)$$

where:

$$C_{CS}ij[dB] = EIRP_{sat}[dBW] - OBO_{eff}(j)[dB] - L_{prop,CS}(j)[dB] + Rx\_Gij[dBi] \quad (5)$$

and $$C_{CS}ik[dB] = EIRP_{sat}[dBW] - OBO_{eff}(k)[dB] - L_{prop,CS}(k)[dB] + Rx\_Gik[dBi]. \quad (6)$$

When the gateway i undergoes a fading event (FIG. 3), the $C_{CS}(i)$ will be affected by the increased amount of $L_{prop}(i)$ whereas the other gateways will most likely not be affected by the fading as due to the big distance the atmospheric conditions will be almost uncorrelated. As a consequence, the C/I cochannel will become:

$$(C/I_{co-channel})_A(i)[dB] = (C_{CS}(i)[dB] - A) - (C_{CS}ij[dB] + C_{CS}ik[dB]). \quad (7)$$

On the other hand, for the case of Uplink Power control, in clear sky the HPA will be operated at larger backoff (lower output power), and when the feeder link experience an attenuation A then the HPA is driven to a lower OBO to compensate A:

$$C_A(i)[dB] = C_{CS}(i)[dB] - A + ULPC_A, \quad (8)$$

where $ULPC_A = \min\{A, ULPC_{range}\}$ and $ULPC_{range}$ is the dynamic range of the HPA.

Besides attenuating the fading due to excess propagation attenuation, this technique brings two major benefits: the intra system interference due to the frequency reuse in a multibeam system and due to the adjacent channels is kept constant as long as the extra attenuation does not exceed the Power Control Dynamic Range, and intermodulation products and distortions generated in the gateway due to the amplifier non-linearities are mitigated in clear sky. In fact, in nominal conditions a lower power is necessary. Working at lower power with a oversized HPA corresponds to increase the Input Back Off therefore operating in linear region.

FIGS. 4(a) and 4(b) illustrate how some key parameters of the uplink of a satellite communication system depend on uplink attenuation, with —FIG. 4(b)—and without—FIG. 4(a)—Uplink Power Control (PC). The relevant parameters are:

The Output Back Off (OBO), representing the difference between the saturated power at the output of the HPA and the actual transmitted power;

The Signal Power over noise ratio (SNR, or C/N);

The Noise Power Ratio (NPR) which indicates the ratio between the useful signal and the intermodulation products.

The Signal to Cochannel interference ratio (C/I cochannel);

The overall Signal Power over noise plus interference ratio C/(N+I), including the cumulated effect of noise, cochannel interference and intermodulation interference (as a preliminary analysis the effect of cross-polar interference has been neglected as it has a lower impact on the end-to-end performance).

As it can be seen, without power control, in Clear Sky, all the power amplifier power is boosted. As soon as the link undergoes fading, the C/I co-channel and the C/N decrease linearly with it.

On the contrary, with Power Control the clear sky C/N is lower since assuming the same HPA sizing is done, less power is transmitted in nominal conditions. When the link undergoes an amount of fading attenuation A, the OBO of the HPA is reduced by A to keep a constant power at the satellite input. This allows keeping a constant C/I co-channel and C/N as long as the power control range is not exceeded (6 dB in the example).

Particular embodiments of "conventional" Uplink Power Control, implementing the general principles discussed above, are disclosed by the following prior art documents:

[RD 3] proposes a method to compensate slow varying fading due to rain based on statistical measurements of the power magnitude of the received reference signal.

[RD 4] describes a power control method in the uplink of a satellite communication system aiming to maintain the power level of the signal arriving at the satellite at the desired level.

[RD 5] proposes a power control technique in the uplink for a fixed-gain bent pipe transponder. In this kind of payload, the signal transmitted by the satellite is just an amplified and frequency converted version of the uplink signal. No level control is assumed to be implemented in the payload. The idea is to recover for the atmospheric attenuation in downlink $A_{down}$ by increasing the transmitted power in uplink by the same quantity. This allows recovering the attenuation at the expenses of a small variation of the onboard HPA Output Back Off (OBO) implying therefore a degradation in terms of intermodulation products. The document proposes to operate the power control in such a way to recover the whole attenuation $A_{down}$.

[RD 6] describes a method to maintain the output power at a bent pipe satellite constant, fully compensating the uplink fade.

Document [RD 7] describes a different UPC technique concatenating power control and channel coding. According to this method, the transmitted power on the uplink is adjusted based on the bit error rate (BER) measure done at the receiver side. When a high number of errors is measured, the system tries first to ask the transmitter to increase the transmitted power. Otherwise stated, the method aims at achieving constant BER, and not necessarily constant power at the satellite input.

[RD 8] describes a method and apparatus to compensate slow and fast variation of the power of the signal at the input of the satellite due to rain clouds and scintillation in order to keep a constant power at the input of the satellite.

[RD 9] presents a method for dynamically setting the operating point of an amplifier in a distributed meshed satellite network to avoid saturation. The adjustment is based on BER measures taken at receiving terminals from a signal transmitted at N power levels.

SUMMARY

The present invention aims at providing an innovative approach to improve the performance of Uplink Power Control. An idea at the basis of the present invention is that, in conventional UPC, the reduction of OBO to compensate for attenuation leads to an increase of intermodulation noise, which can become the dominant factor limiting the achievable channel capacity. To avoid this drawback of the prior art, the invention proposes optimizing the operating point of the High Power Amplifier (HPA) as a function of several system parameters, instead of fully compensating the excess attenuation. This implies the use of a variable gain amplifier onboard which allows keeping the onboard HPA being operated at a specific OBO level independently of the uplink power level (as currently done in such kind of satellites).

For a multi-beam system operating over Europe and exploiting Q/V-band for the feeder link, the inventive concept allows to typically gain around 30-40% of the capacity under certain atmospheric conditions without adding any complexity to the equipment. When site diversity techniques are used, the inventive concept allows a significant reduction in the number of gateways necessary to satisfy availability requirements.

A first object of the invention is then an "interference aware" Uplink Power Control method according to claim 1, comprising adjusting an operating point of a High-Power Amplifier of a ground-to-satellite emitter as a function of propagation attenuation, characterized in that it comprises the steps of:

a) determining an optimal Output Back Off value of said High-Power Amplifier which, for an operational propagation attenuation level, maximizes a Signal over Noise plus total interference ratio at the satellite taking into account contributions from cochannel and cross-polar interferences, intermodulation interferences and thermal noise; and b) setting the operating point of the High-Power Amplifier at said optimal Output Back Off value.

The propagation attenuation is mostly due to atmospheric attenuation and is strongly dependent on weather, being minimal in "clear sky" conditions.

The expression "High-power amplifier" does not imply a specific, or minimal, power level. It is an expression customarily used in the field of radio-electronics to denote the amplifier operating at the highest power level of a signal path of an emitter (usually, the amplifier driving the antenna, or in any case the last amplifier on the signal path before the antenna).

Most often in satellite communications at these frequencies, HPA are implemented using travelling wave tubes (TWTA).

A second object of the invention is a ground-to-satellite emitter comprising:
  a High-Power Amplifier; and
  control means for adjusting an operating point of said High-Power Amplifier by carrying out a said method.

Particular embodiments of the invention constitute the subject-matter of the dependent claims.

BRIEF DESCRIPTION OF THE DRAWINGS

Additional features and advantages of the present invention will become apparent from the subsequent description, taken in conjunction with the accompanying drawings, which show.

DETAILED DESCRIPTION

As discussed above, classical Uplink Power Control consists in compensating the excess atmospheric attenuation A, essentially due to rain, by reducing the HPA OBO the same quantity. In this way, the input power at the satellite stays constant as long as the HPA dynamic range is not exceeded.

Figure 1A:
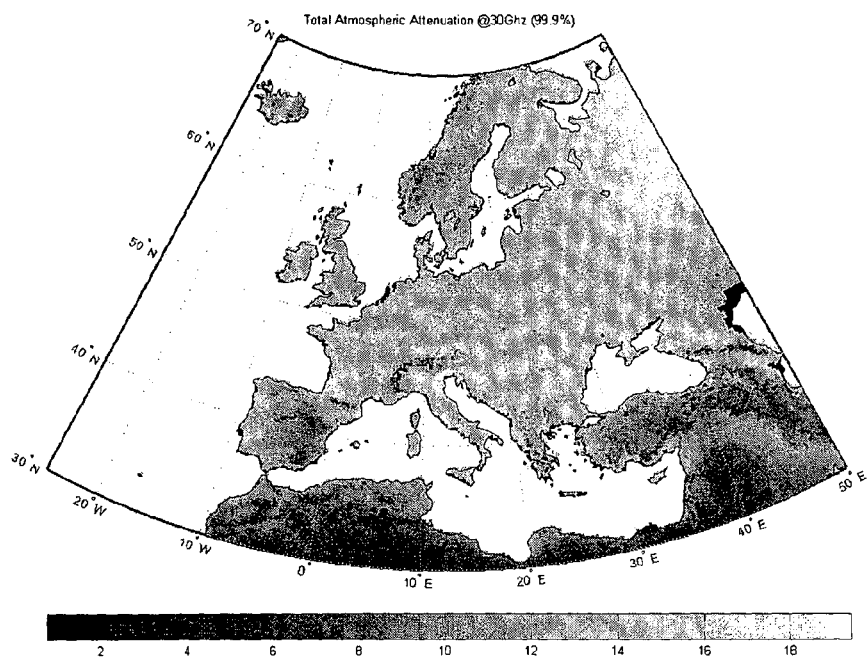
FIGS. 1(a) and 1(b) compare the total atmospheric attenuation (in dB) not exceeded for 99.9% of the time in the average year at 30 GHz (Ka band) and 50 GHz (V band), respectively.
Figure 1B:
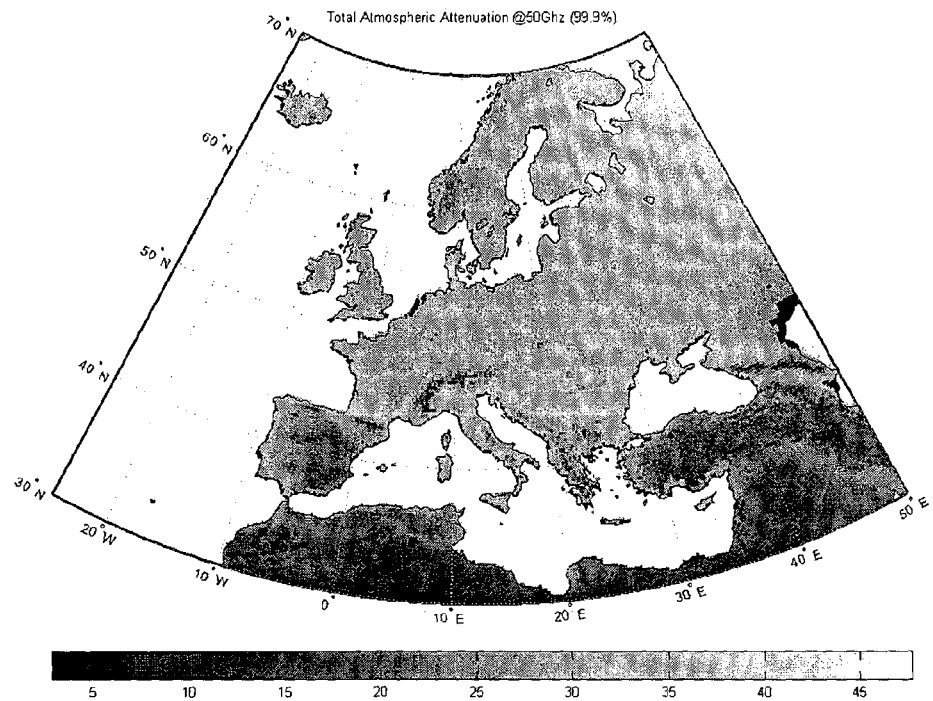
Figure 2:
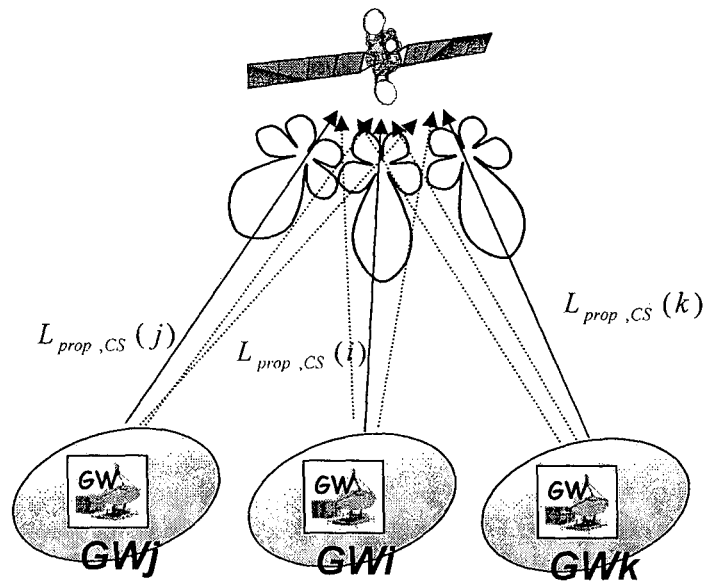
FIG. 2 shows a system architecture of a multibeam star network in which each gateway deployed within a service area serves a subset of User Beams.
Figure 3:
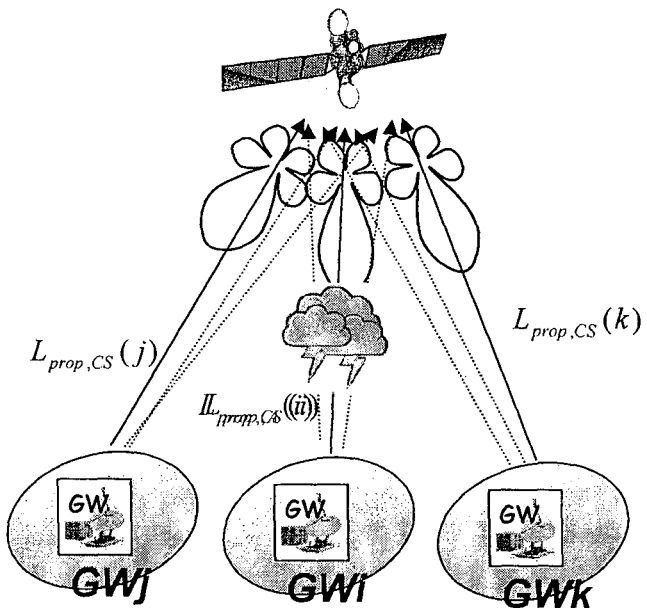
FIG. 3 shows a system architecture of a multibeam star network in which one of the gateways is under fading conditions due for instance to a rain event. $L_{prop,A}$ denotes the propagation attenuation in these non-clear sky conditions.
Figure 4A:
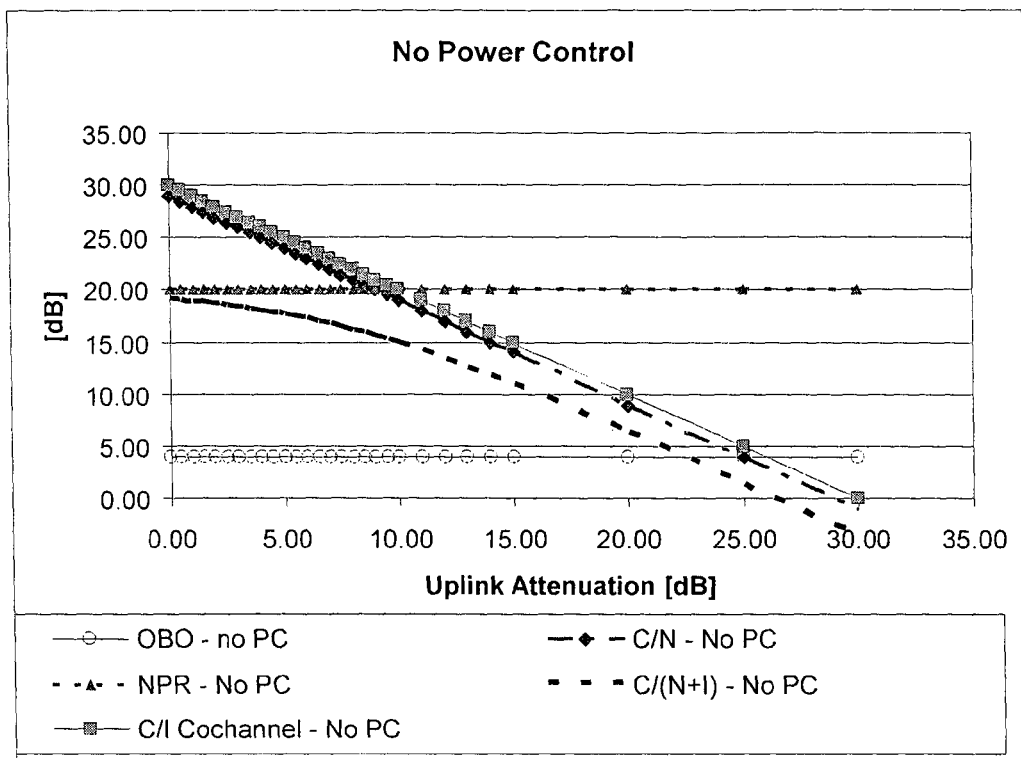
FIGS. 4(a) and 4(b) illustrate how some key parameters of the uplink of a satellite communication system depend on uplink attenuation.
Figure 4B:
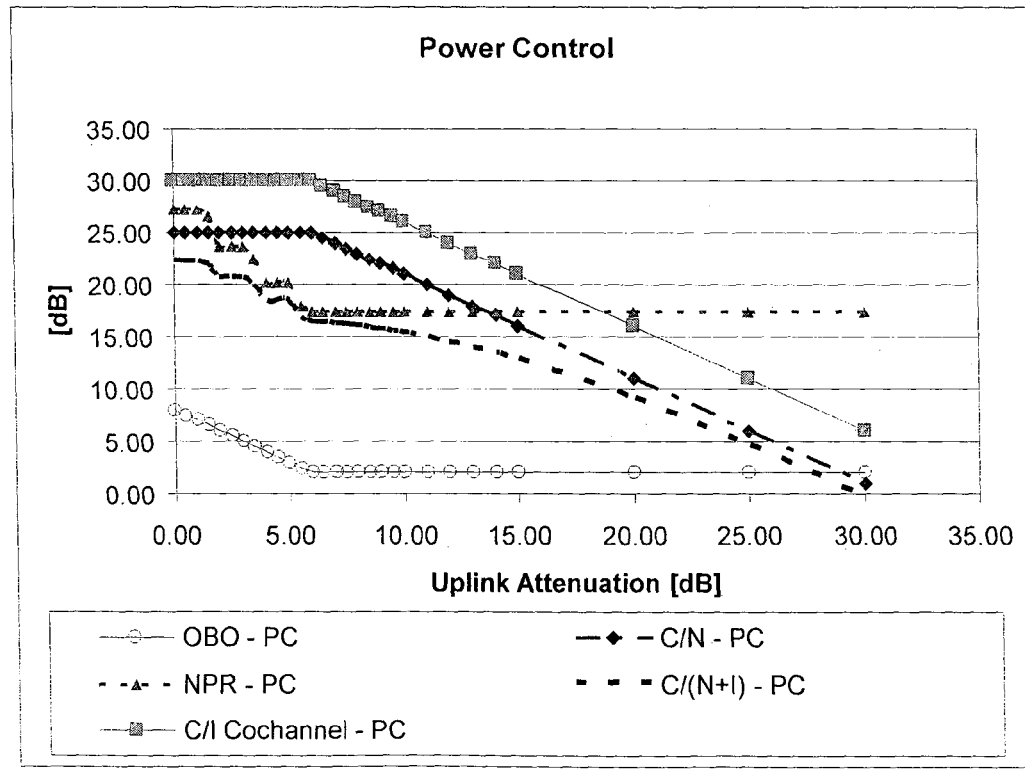
Figure 5:
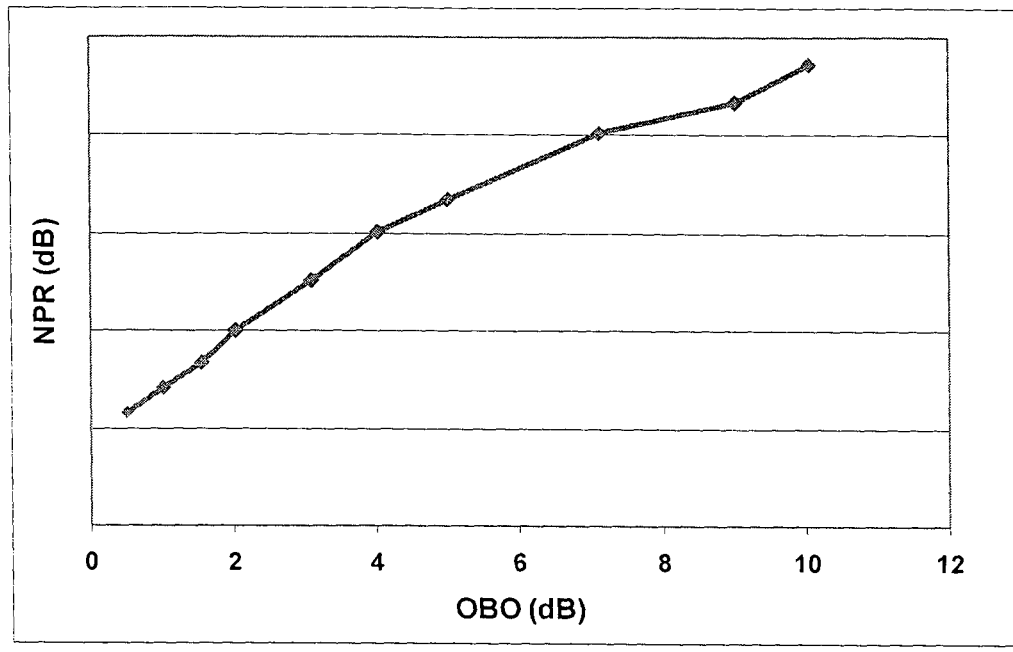
FIG. 5, an exemplary Noise Power Ratio (NPR) curve versus the HPA OBO.

As the present inventors have realized, the main drawback of this technique is that the intermodulation products generated in the gateway HPA may become the limiting factor of the uplink SNIR (Signal over Noise plus total interference ratio). The lower the OBO, the higher are the effect of intermodulation and distortion. An example of Noise Power Ratio (NPR) curve versus the HPA OBO is shown qualitatively in FIG. 5. The Noise Power Ratio is related to the Carrier over Intermodulation interference by the following relation:

$$NPR = \frac{C}{I_{im}} - 1 \quad (9)$$

The NPR is often used in place of the $C/I_{im}$ due to its practicality in terms of direct measurability.

The proposed invention consists in defining the operating point (i.e. the operational HPA OBO, denoted by $OBO_{eff}$) as a function of the excess atmospheric attenuation A by optimizing (maximizing) the Signal over Noise plus total interference ratio SNIR, given by:

$$\max_{OBO_{eff}(A)} \left\{ \frac{1}{\left(\frac{C(OBO_{eff}(A))}{N}\right)^{-1} + \left(\frac{C(OBO_{eff}(A))}{I_{co}} + cte\right)^{-1} + (NPR(OBO_{eff}(A)) - 1)^{-1}} \right\} \quad (10)$$

where $$C(OBO_{eff}(A)) = EIRP_{SAT} - OBO_{eff}(A) - L_{prop}(A) + RX\_G, \quad (11)$$

$$L_{prop}(A) = L_{FS} + L_{Polarization} + A, \quad (12)$$

and $$cte = XPD + XPI + \frac{G_{sat\_copolar}}{G_{sat\_crosspolar}}. \quad (13)$$

In the equations above:
C is the carrier power, measured at the satellite input;
N is the noise power;
$I_{co}$ is the cochannel interference power;
$I_{im}$ is the intermodulation interference power;
$EIRP_{SAT}$ is the Saturated Effective Isotropic Radiated Power;
$G_{sat\_copolar}$ is the satellite antenna co-polar gain;
$G_{sat\_crosspolar}$ is the Satellite antenna cross-polar gain;
$L_{FS}$ are the Free Space Losses;
$L_{Polarization}$ are the Polarization Losses;
$L_{prop}$ are the Total Propagation Losses; and
RX_G is the Satellite Reception Antenna Gain;
XPD is the Cross-Polar Discrimination (Atmosphere); and
XPI is the Cross-Polar Isolation (Gateway Antenna).

It is worth highlighting that the intermodulation power spectral density is not constant over the band due to the band-limited nature of the input signal.

As a consequence, not all the carriers amplified by the HPA will be affected by the same amount of intermodulation power.

The typical shape of the power spectral density versus frequency is Gaussian, with a variation in power of around 3-4 dB.

In the current proposed optimization, the optimal operating point is found for the central carrier, affected by the highest amount of intermodulation noise. The operational OBO is found assuming that all the carriers will be affected by the same level of intermodulation. This assumption is proven not to imply performance degradation on the carriers at the side of the band, as will be shown in the simulation results. In case the technique should be applied to HPAs with large variations of NPR over the band, the optimization can be trivially extended to find the optimal point to optimize the average SNIR over all the carriers in the HPA by substituting in the previous equation the average SNIR defined as $$\overline{SNIR} = \frac{1}{N_{carriers}} \cdot \sum_{c=1}^{N_{carriers}} SNIR_c.$$

The optimization problem in (10) can be solved in different ways.

Following a "brute force" approach, the SNIR is computed for a set of predetermined values of OBO and A, which allows determining an approximately optimal OBO for a given estimated attenuation. The higher the number of said predetermined values, the higher is the accuracy of the optimization.

Following an analytical approach, the NPR(OBO) is approximated by a polynomial fitting (in dB), which provides an analytical expression for SNIR. An approximated value for $OBO_{eff}$ can be found by nulling the derivative of said expression with respect to OBO for every instantaneous value of the attenuation A.

A $4^{th}$ order polynomial fitting is found to be accurate enough for the optimization; the NPR can then be expressed as:

$$NPR(OBO_{eff}) = a \cdot (OBO_{eff})^4 + b \cdot (OBO_{eff})^3 + c \cdot (OBO_{eff})^2 + d \cdot OBO_{eff} + e \quad (14)$$

Defining $$\frac{C(OBO_{eff})}{N} = \frac{EIRP_{SAT} \cdot RX\_G}{k \cdot T \cdot R_{smb} \cdot L_{prop} \cdot OBO_{eff}} = \frac{f}{OBO_{eff}} = \frac{f}{10^{\frac{OBO_{eff}[dB]}{10}}} \quad (15)$$

and $$\frac{C(OBO_{eff})}{I_{co-channel}} = \frac{EIRP_{SAT} \cdot RX\_G}{I_{co-channel} \cdot L_{prop} \cdot OBO_{eff}} = \frac{g}{OBO_{eff}} = \frac{g}{10^{\frac{OBO_{eff}[dB]}{10}}} \quad (16)$$

equation (10) can then be written as $$\max_{OBO_{eff}(A)} \left\{ \frac{1}{\left(\left(\frac{f}{10^{\frac{OBO_{eff}(A)[dB]}{10}}}\right)^{-1} + \left(\frac{g}{10^{\frac{OBO_{eff}(A)[dB]}{10}}} + cte\right)^{-1} + \left(10^{\frac{a \cdot (OBO_{eff}(A)[dB])^4 + b \cdot (OBO_{eff}(A)[dB])^3 + c \cdot (OBO_{eff}(A)[dB])^2 + d \cdot OBO_{eff}(A)[dB] + e}{10}} - 1\right)^{-1}\right)} \right\} \quad (18)$$

Nulling the derivative of (17) gives:

$$\frac{d}{d \cdot x}\left\{ \frac{1}{\left(\frac{f}{10^{\frac{x}{10}}}\right)^{-1} + \left(\frac{g}{10^{\frac{x}{10}}} + cte\right)^{-1} + \left(10^{\frac{a \cdot (x)^4 + b \cdot (x)^3 + c \cdot (x)^2 + d \cdot x + e}{10}} - 1\right)^{-1}} \right\} = = \quad (17)$$

$$\left( \frac{10^{\frac{x}{10}-1}}{f} + \frac{g \cdot 10^{-\frac{x}{10}-1}}{\left(g \cdot 10^{-\frac{x}{10}} + cte\right)^2} - \frac{(4 \cdot a \cdot x^3 + 3 \cdot b \cdot x^2 + 2 \cdot c \cdot x + d) \cdot 10^{\left(\frac{a \cdot x^4 + b \cdot x^3 + c \cdot x^2 + d \cdot x + e}{10}\right)-1}}{\left(10^{\frac{a \cdot x^4 + b \cdot x^3 + c \cdot x^2 + d \cdot x + e}{10}} - 1\right)^2} \right) = 0$$

where for simplicity of notation $OBO_{eff}=x$.

Equation (18) can be then solved through numerical methods. It has 8 roots; the real ones are substituted in (10) and the one giving the highest SNIR is kept.

An additional check is then done on the selected root:

$$OBO_{eff}(A) = \begin{cases} ULPC_{range} & \text{if} \quad OBO_{eff}(A) > ULPC_{range} \\ OBO_{min} & \text{if} \quad OBO_{eff}(A) < OBO_{min} \\ OBO_{CS} & \text{if} \quad C(A) > C_{CS} \\ OBO_{eff}(A) & \text{if} \quad \text{otherwise} \end{cases} \quad (19)$$

where $ULPC_{range}$ is the Uplink Power Control range, $OBO_{min}$ is the minimal allowed value for the Output Back Off, $OBO_{CS}$ is the Output Back Off in clear sky ("nominal") conditions and $C_{CS}$ is the carrier power in clear sky conditions. The two first conditions impose that $OBO_{eff}$ remains within acceptable limits, and the third one avoids "supercompensation" of attenuation, leading to a carrier power at the satellite higher than in clear sky conditions.

It is worth mentioning that in multi-beam scenarios with a multiplicity of gateways deployed, the optimization is carried out independently for every gateway. In the optimization of each single gateway, the operating point is chosen assuming that all the other gateways are operating at the same OBO of the target gateway in clear sky. The third condition in (19) only necessary in this case, otherwise the optimization would lead to boost a power higher than the power in clear sky to improve (artificially) the C/I cochannel.

In practical terms, in order to implement the optimization procedure described in this paragraph, the Gateway need to estimate the C/N, C/I co-channel and C/I cross polar, and the NPR of the HPA in a static way. In other words, these parameters need to be estimated just once for all. On the other hand, the technique requires the dynamic estimation of the Attenuation, necessary to dynamically optimize the corresponding operating point.

Concerning the first static parameters to be estimated, the C/I cochannel in clear sky and the C/I cross polar (assuming that the feeder link operates on both the orthogonal polarizations) can be estimated either via measurements on the onboard antenna or measuring the power of a downlink beacon towards the gateways. Similarly, the C/N in clear sky can be extrapolated via beacon measurements on ground and via measurements on the characteristics of the equipments (i.e. gateway antenna gain, satellite noise figure etc). The technique is proven to be quite robust to estimation errors as it will be shown later.

Figure 39:
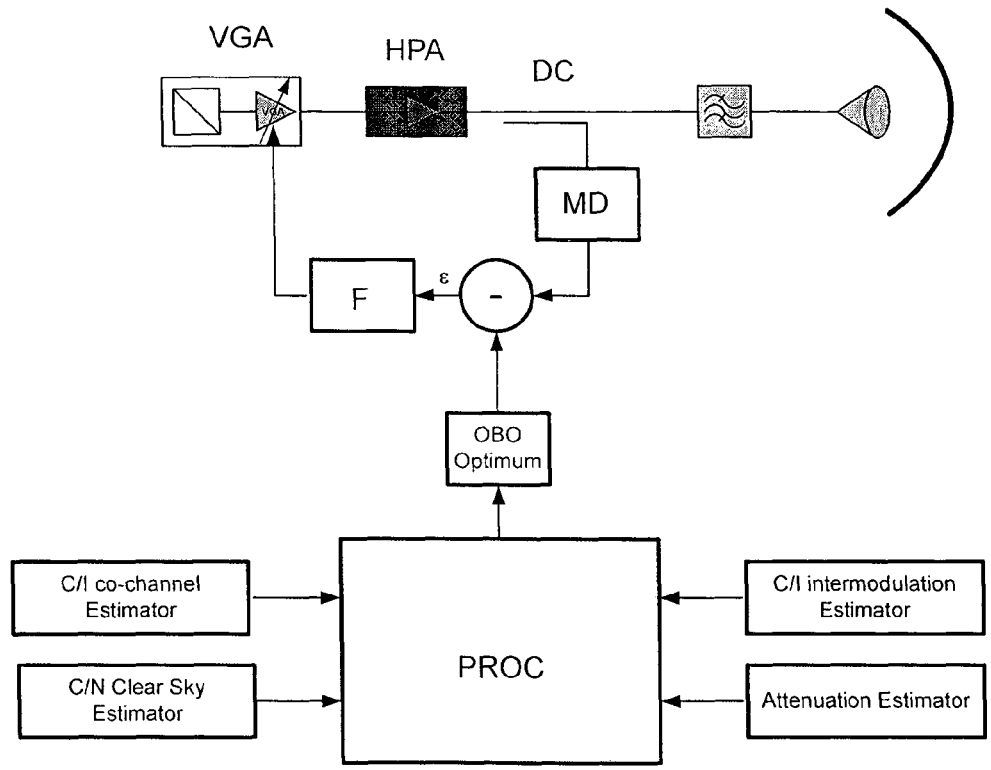
FIG. 39, the block diagram of a ground-to-satellite emitter according to an embodiment of the invention.

The proposed invention requires the ground-to-satellite emitter to be able to adaptively control the operating point of the HPA, as for the classic method. A possible implementation, using a HPA of the TWTA kind, is shown in FIG. 39.

A Variable Gain Amplifier provides a gain $G_{VGA}$ according to the desired OBO of the HPA. This gain has to be set therefore to:

$$G_{VGA} = \frac{\frac{P_{in,sat}^{HPA}}{IBO}}{P_{in}^{VGA}} \quad (20)$$

Where $P_{in,sat}^{VGA}$ is the saturated input power to the HPA, IBO is the HPA required Input Back Off and $P_{in,sat}^{HPA}$ is the input power to the VGA.

The VGA is driven by a signal produced by filtering with a low pass filter (filter F), the difference $\epsilon$ between the desired OBO and the actual one. In practice, a fraction d<<1 of the output power of the HPA is extracted by a directional coupler DC and measured by a suitable measuring device MD. Then, the difference between the nominal saturated output power of the HPA divided by the directivity d of the coupler and the power value measured by MD is computed. The desired OBO is then generated by a processor PROC executing the algorithm described above using as an input the estimations of the C/N, C/I co-channel, and the atmospheric attenuation. Furthermore, the technique requires the knowledge of the $C/I_{im}$ versus the OBO, which can be obtained through calibration.

The technical result of the invention, i.e. the performance gain it allows over classical Uplink Power Control, has been assessed through full system simulations based on multi-dimensional link budget in space and time. The exemplary system considered here is not limitative, and the invention can be applied to very different networks, having e.g. mesh topology.

Figure 6A:
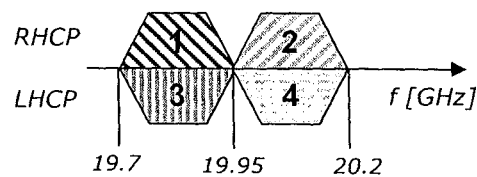
FIGS. 6(a) and 6(b), respectively, the Forward Used Downlink and the Forward Feeder Uplink frequency plans of an exemplary broadband star system using Ka band in the user link and Q/V band in the feeder link.
Figure 6B:
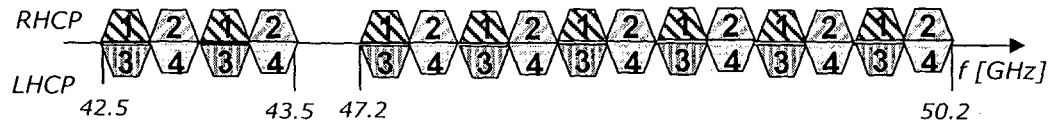

This analysis has performed on an exemplary broadband star system using Ka band in the user link and Q/V band in the feeder link. The frequency plan, comprising four "colours" i.e. frequency/polarization pairs 1-4 and accounting for the relevant regulations on the use of the radio-frequency spectrum, is shown in FIG. 6(*a*) and FIG. 6(*b*). RHCP and LHCP stand for right-hand and left-hand circular polarization, respectively.

Figure 7:
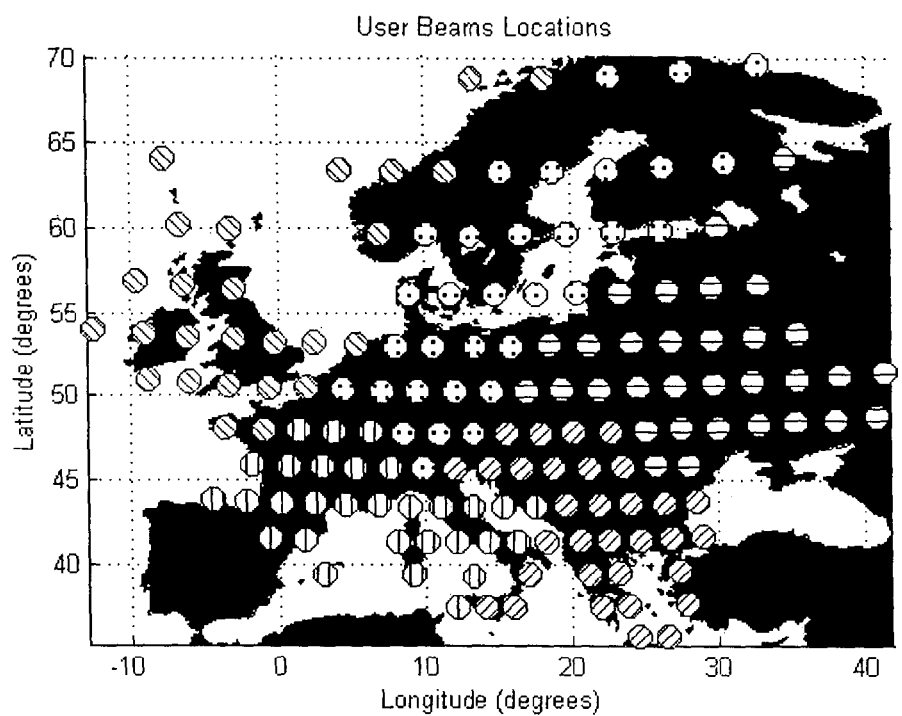
FIG. 7, the centres of the user beams of said exemplary system.
Figure 8:
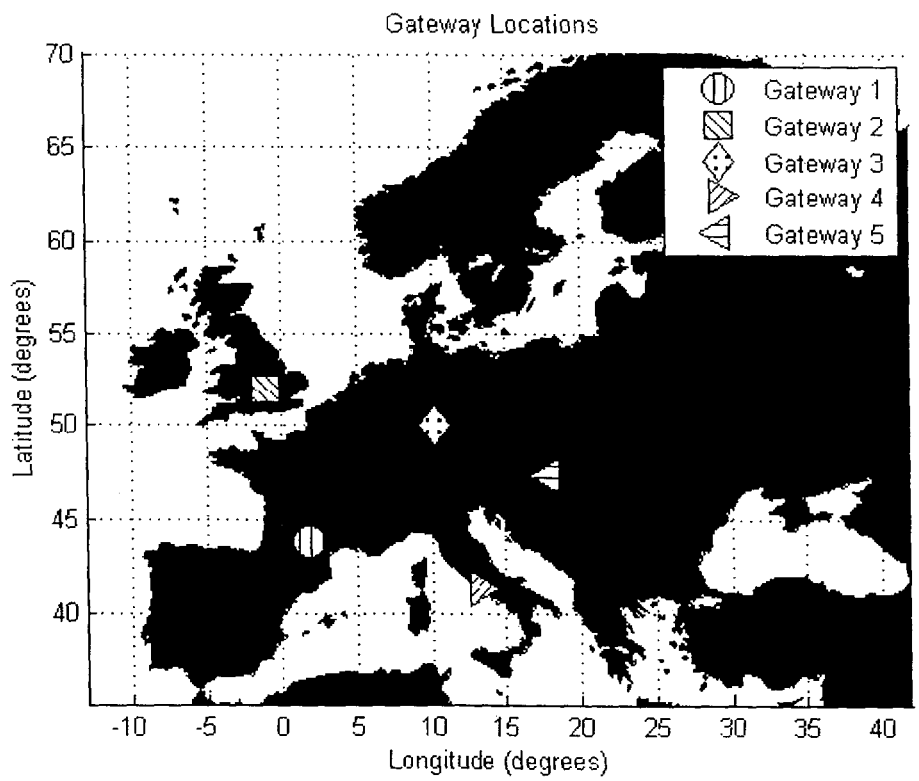
FIG. 8, the locations of the gateways of said exemplary system.

The satellite of the exemplary systems has an on-board antenna implementing ~150 user beams over Europe, served by 5 Gateways. The beam centres are shown in FIG. 7. The grey levels represent the association of the user beams to the gateways, shown in FIG. 8.

The system sizing for carrying out the simulations were fixed according to the technology roadmap settled by the European Space Agency for next generation broadband systems in the 2020 timeframe. The following tables show the system sizing for the different system segments.

TABLE 1

User Terminal Sizing
User Terminals - Rx Section

| | | |
|---|---|---|
| Antenna Diameter | (m) | 0.60 |
| Antenna Efficiency | (%) | 65.00 |
| Pointing Loss | (deg) | 0.50 |
| Clear Sky Noise Temperature | (K) | 78.00 |
| Ground Noise Temperature | (K) | 45.00 |
| Feeder Noise Temperature | (K) | 290.00 |
| Input Loss | (dB) | 0.2 |
| Rx Noise Figures | (dB) | 2.00 |
| Antenna XPI | (dB) | 23.00 |

TABLE 2

Satellite Payload sizing

Satellite Payload

| | | |
|---|---|---|
| Carrier baud rate | (Msps) | 208.00 |
| roll-off | | 0.20 |
| | Rx Section | |
| Noise Temperature | (dBK) | 29.50 |
| | Tx Section | |
| Carriers per beam | | 2.00 |
| Carriers per HPA | | 1.00 |
| TWTA Saturated Power | (W) | 110.00 |

TABLE 2-continued

Satellite Payload sizing

| | | |
|---|---|---|
| Output losses | (dB) | 2.000 |
| IBO | (dB) | 0.500 |

The performance comparison is carried out under three different assumptions on the setting of the OBO boundary values for the conventional prior art ("classic") approach, and considering two different gateway sizing.

The sizing of the two gateways is representative of two different possible strategies pursued by the system operator.

On the one hand, the operator can decide to deploy the lowest number of gateways, therefore not exploiting any kind of gateway site diversity. In such a case, the gateway must be sized to be robust to the atmospheric impairments up to the percentage of time required by the feeder availability. Usually, this availability is chosen to be 99.9%.

On the other hand, the operator can decide to exploit diversity techniques such as the one described by [RD 11], increasing the number of gateways (redundancy) but reducing their individual sizing. In this case, depending on the number of nominal and redundant gateways, the "availability area" interesting is somewhere lower than 99.9%.

The following tables show the sizing parameters of the "large" and "small" gateways ("4 col" means "four colours").

TABLE 3a

Large Gateway Sizing
Large Gateways - Tx Section

| | | 4 col |
|---|---|---|
| Number of Gateways | ( ) | 5 |
| Antenna Diameter | (m) | 4.50 |
| Antenna Efficiency | (%) | 65.00 |
| HPA Saturated Power (per Polarization) | (W) | 1000.00 |
| Carriers per HPA | ( ) | 16 |
| Output Losses | (dB) | 2.00 |
| Pointing Loss | (deg) | 1.00 |
| Antenna XPI | (dB) | 27.00 |

TABLE 3b

Small Gateway Sizing
Small Gateways - Tx Section

| | | 4 col |
|---|---|---|
| Number of Gateways | ( ) | N + P with N = 5, P = number of redundant gateway (depends on implementation) |
| Antenna Diameter | (m) | 3.50 |
| Antenna Efficiency | (%) | 65.00 |
| HPA Saturated Power (per Polarization) | (W) | 500.00 |
| Carriers per HPA | ( ) | 16 |
| Output Losses | (dB) | 2.00 |
| Pointing Loss | (deg) | 1.00 |
| Antenna XPI | (dB) | 27.00 |

The performance metric is different for the two cases. In the first case with the larger gateway, the figure of merit is the difference in the capacity degradation up to 99.9% of the time with the classic and the optimized power control. For the second scenario, the approach is to derive the number of required redundant gateways to be deployed to ensure a feeder availability of 99.9% with classic and optimized power control.

For each of the 2 scenarios, the classic power control technique has evaluated under three different assumptions on the boundaries used for the OBO. The first case is to compare the techniques when the OBO boundaries are the same. From the technical point of view, this is a fair comparison since it allows comparing the advantages of the proposed invention on a common ground.

The second and third cases are to assume an undersized and oversized OBO in clear sky. Specifically, for the undersized case the OBO varies from 0.5 to 4 dB for the large gateway and from 0.5 to 2.5 dB for the small gateway, while in the oversized case the limits are from 4 to 8 dB with the large gateway and from 2 to 6 dB for the small gateway.

These cases are representative of what could happen due to an error in the setting of the OBO settings for the classic power control. In fact, usually satellite operators set these boundaries in a pragmatic way which may end up being far from the optimal settings.

The following table summarizes the test cases for the performance assessment.

TABLE 4

Test Cases

| Gateway Type | OBO - same boundaries | OBO - oversized | OBO - undersized |
|---|---|---|---|
| LARGE | Case 1a | Case 1b | Case 1c |
| SMALL | Case 2a | Case 2b | Case 2c |

Case 1a

In this case the boundaries of the OBO for the classic and optimised technique are set to the same values. This is the best performance that can be achieved by the classic technique ("optimized range"), and this case is considered the best test to compare the advantage of the proposed techniques.

Results are shown in FIGS. 9-14.

Figure 9:
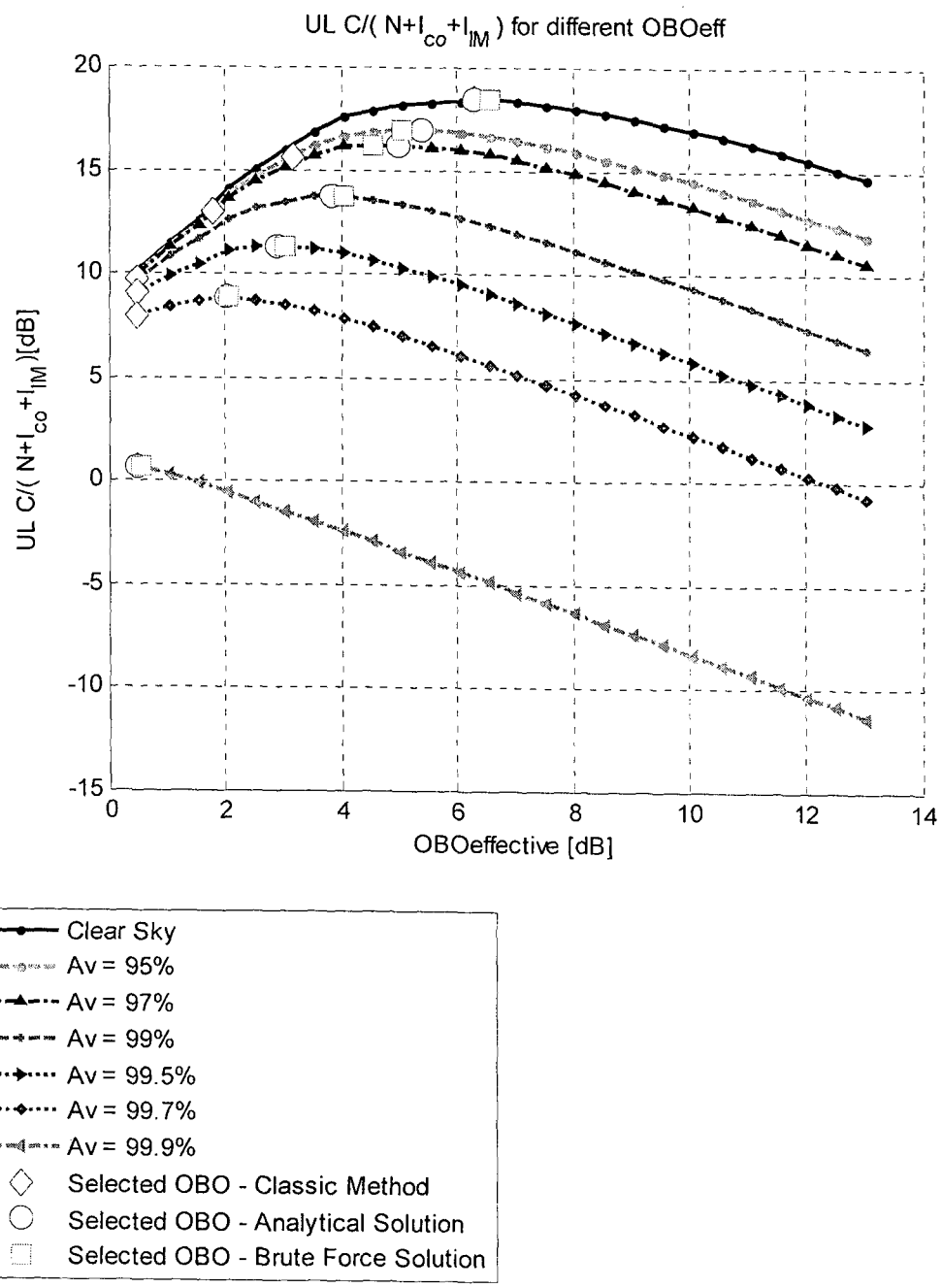
FIG. 9 to FIG. 22, curves comparing the performances of a first embodiment of said exemplary system when implementing an Uplink Power Control method according to the invention and a method according the prior art.

FIG. 9 shows the optimization process of the proposed technique and the OBO values used by the classic method. Every curve represents the SNIR at a given atmospheric attenuation as a function of the OBO; attenuation is expressed by the corresponding availability Av—for instance Av=95% denotes an attenuation level which is not exceeded 95% of the time, or equivalently which is exceeded 5% of the time and so on. Diamond marks corresponds to the classic technique, circles to the inventive method using the "brute force" implementation and squares to the inventive method using the "analytical" implementation. It can be clearly seen that the proposed interference aware technique is able to maximize the uplink SNIR choosing the optimal OBO.

Figure 10:
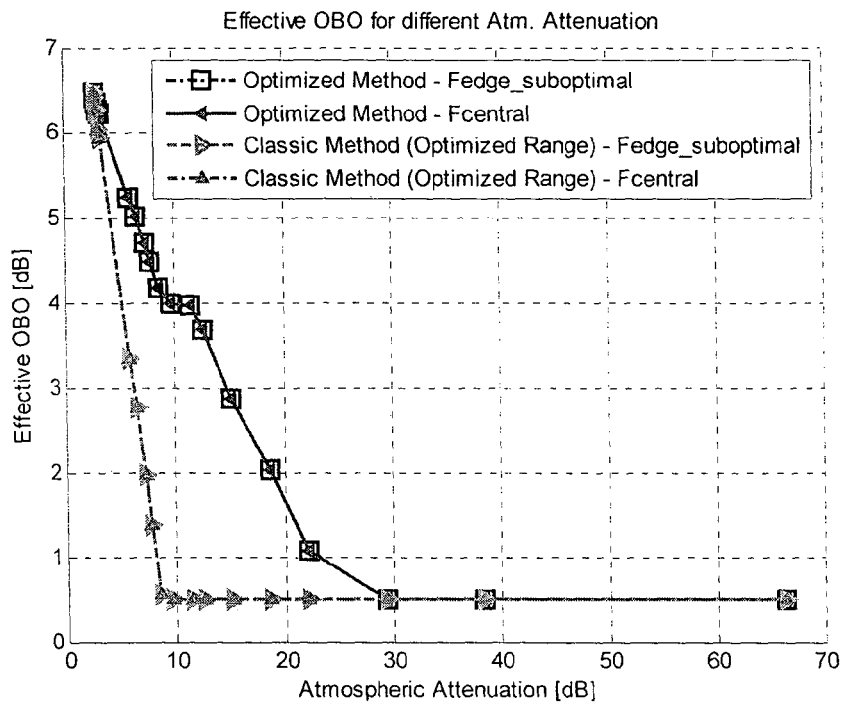

FIG. 10 shows the OBO versus the atmospheric attenuation for the classic and optimized method versus the uplink attenuation. "Fcentral" means that the central carrier—used for the optimization of the OBO—is considered; "Fedge_suboptimal" refers to an edge carrier, for which the operating point is (very slightly) sub-optimal.

Figure 11:
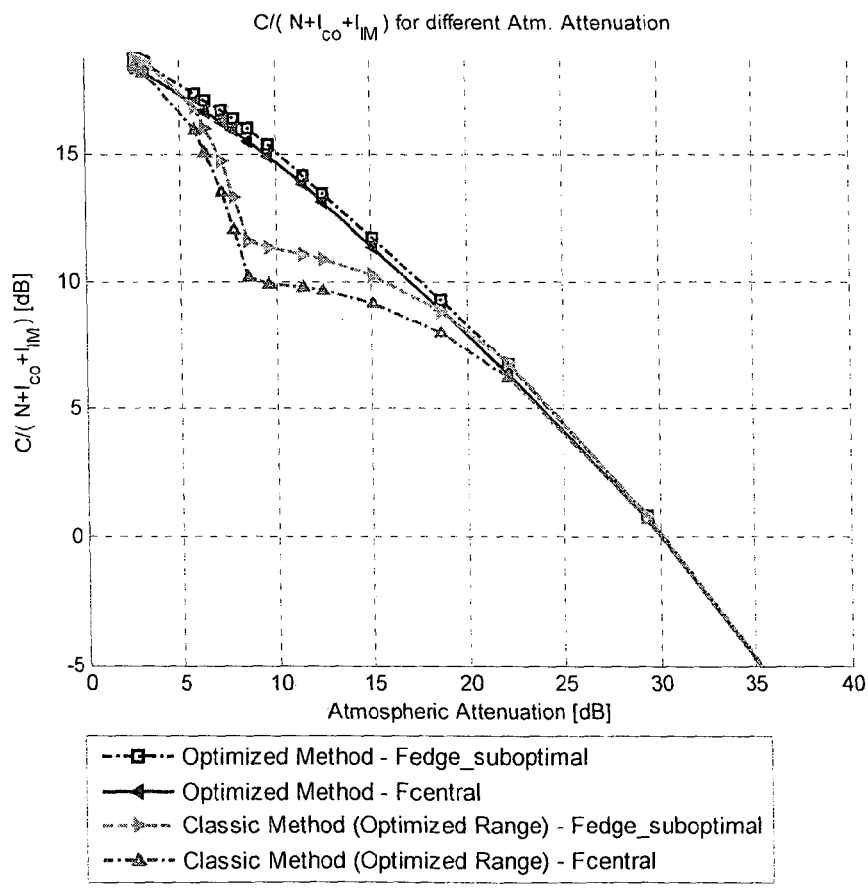

FIG. 11 shows the uplink SNIR for the optimized and classic method, for the central and edge carriers. As expected, the SNIR of the edge carrier is higher than the central one as the intermodulation noise is lower. In this case, the gain in SNIR is in the order of 7 dB for attenuations in the order of 8-10 dB. The gain remains remarkable up to an attenuation of 15 dB.

Figure 12A:
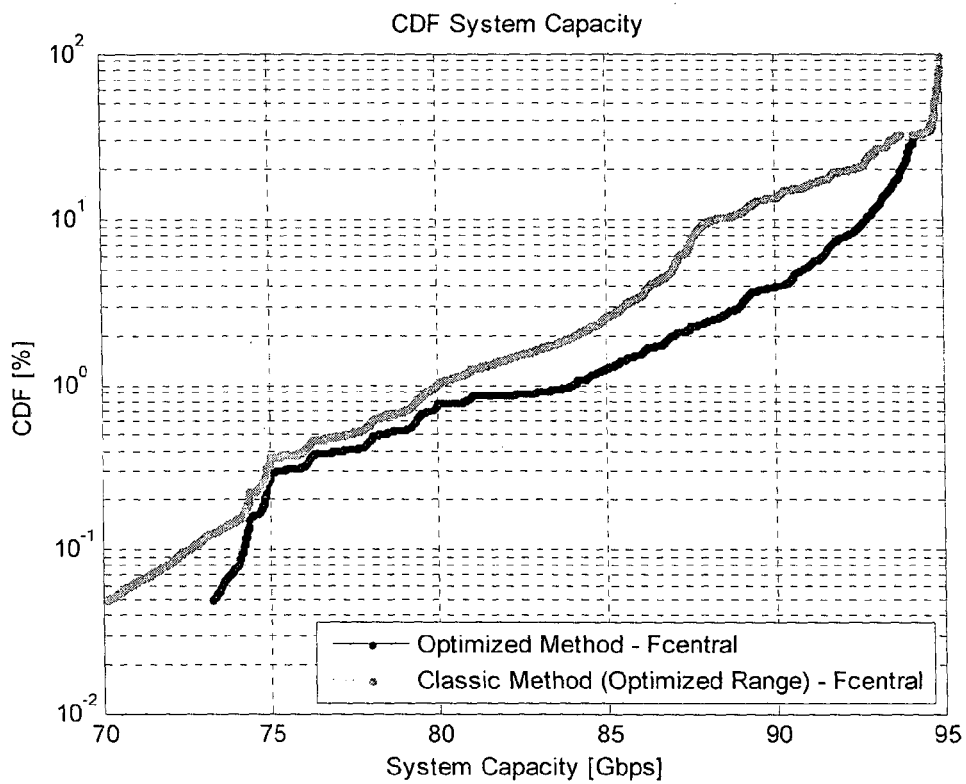
Figure 12B:
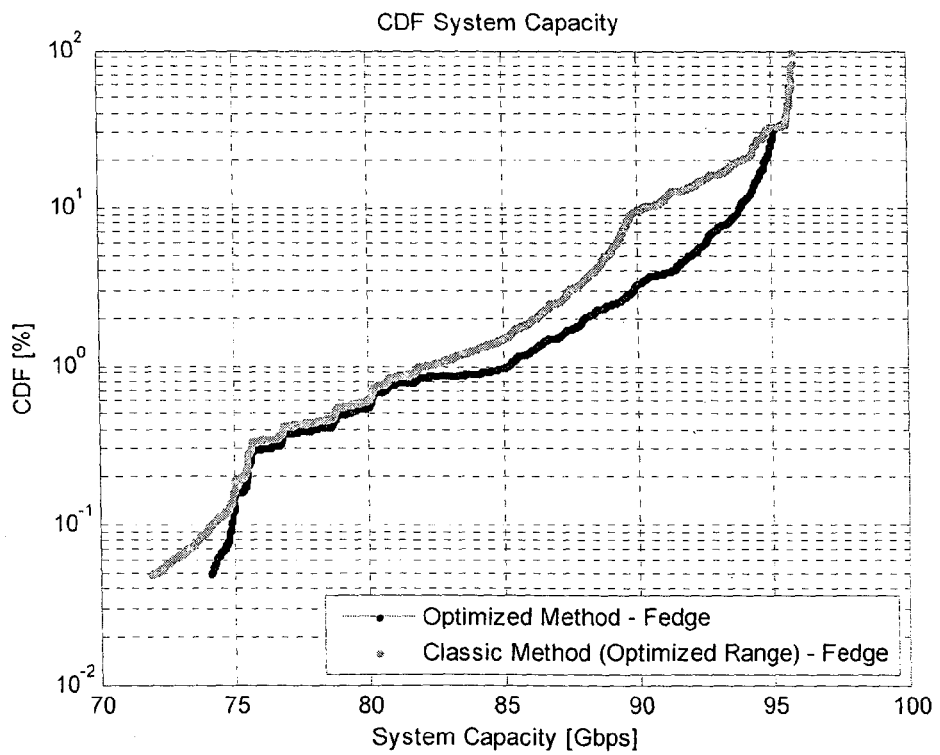

FIGS. 12(a) and 12(b) show the cumulative distribution function CFD of the system capacity using the classic method (light grey) and the optimised one (dark grey), assuming that all the carriers are affected by the intermodulation level seen by the central carrier (a) and the edge carrier (b). For each of the two techniques, the total capacity will be actually somewhere between the light and dark gray curves in FIGS. 12(a) and (b) as the intermodulation noise will be varying for every carrier. Comparing the two techniques, the clear sky capacity (CDF=100%) is the same in the two cases as the clear sky OBO is set to the same value.

In both cases, the proposed technique allows increasing the system capacity, and the capacities in the two assumptions (central carrier—edge carrier) are very close. This means that the optimization does not strictly need to account for the variation of the NPR for the different carriers.

Figure 13:
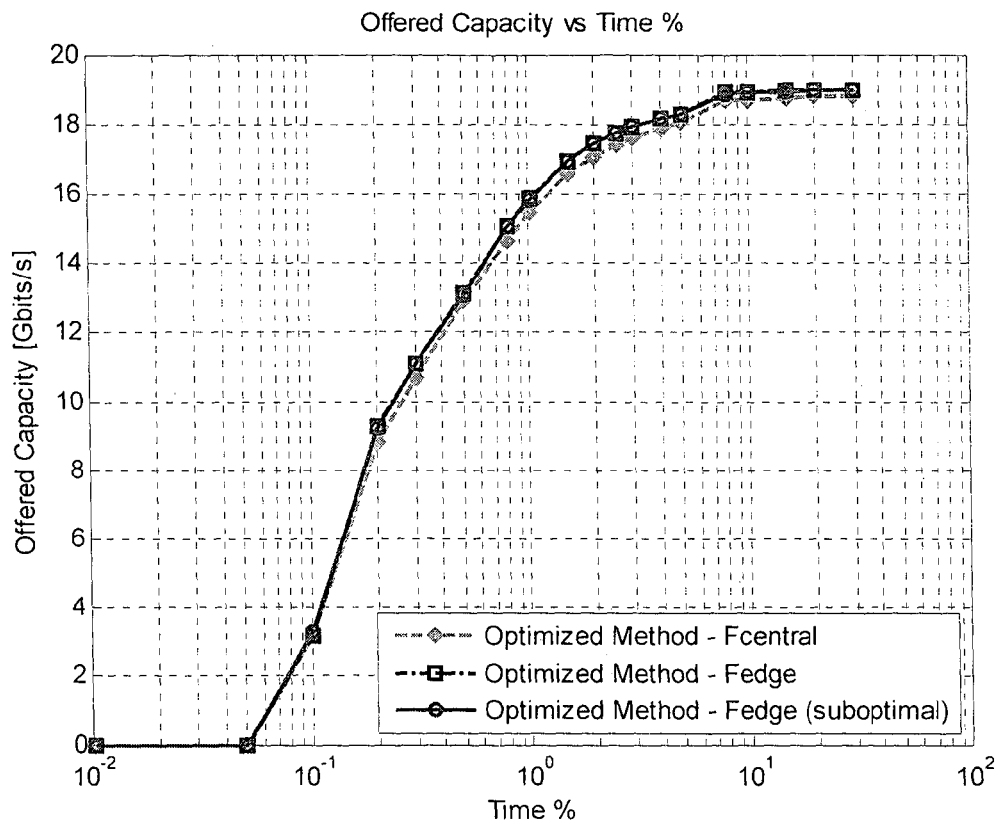

FIG. 13 shows the cumulative distribution function of the offered capacity of Gateway 1 alone for the central frequency, and for the edge frequency when the OBO is optimized for the edge frequency itself or for the central frequency (suboptimal point). The x-axis represents the total percentage of time in the average year for which the capacity is lower than the value expressed in the y-axis. It can be noticed that the capacity of the central carrier is lower than the edge carrier, due to the higher intermodulation level. On the other hand, it is clearly shown that operating the HPA at the OBO optimal for the central carrier in the edge carrier does not imply any loss compared to the OBO optimized on the edge carrier. Once again, this result demonstrates that the level variation of the NPR in frequency does not require the technique to operate on the SNIR average, and that optimizing on the central band NPR allows achieving (almost) the optimal results.

Figure 14:
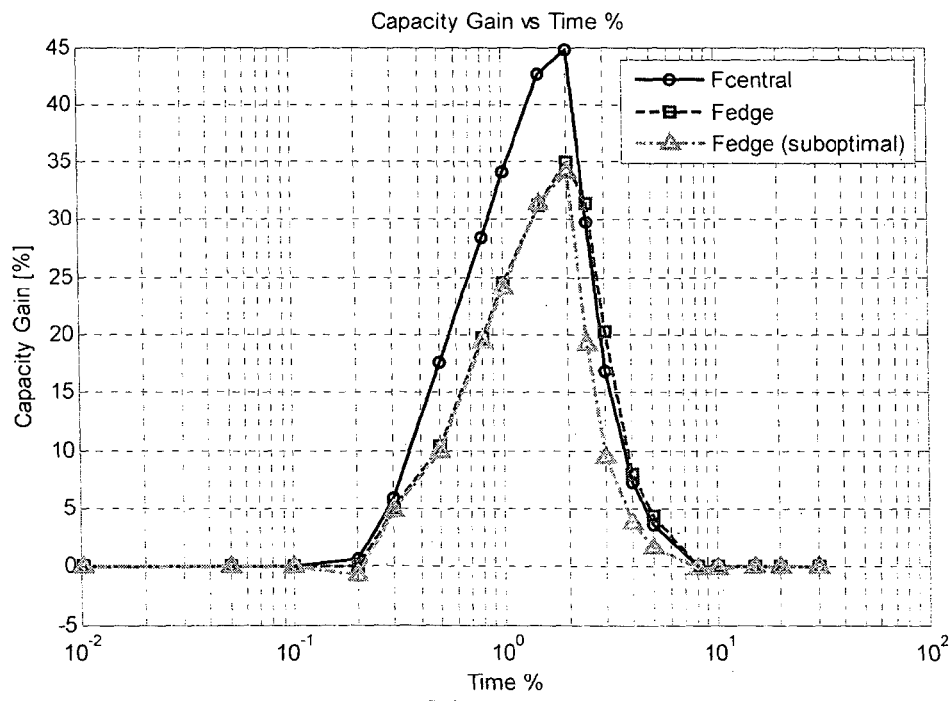

FIG. 14 shows the capacity gain of the technique versus the classic method for Gateway 1, for the central frequency, edge frequency with its optimal OBO and edge frequency with suboptimal OBO. For this gateway, the gain has a maximum of around 45% at 99.9% availability.

The gain reduces to around 35% on the edge frequency, as the intermodulation is lower.

Case 1b

The results are shown in FIGS. 15-18.

Figure 15:
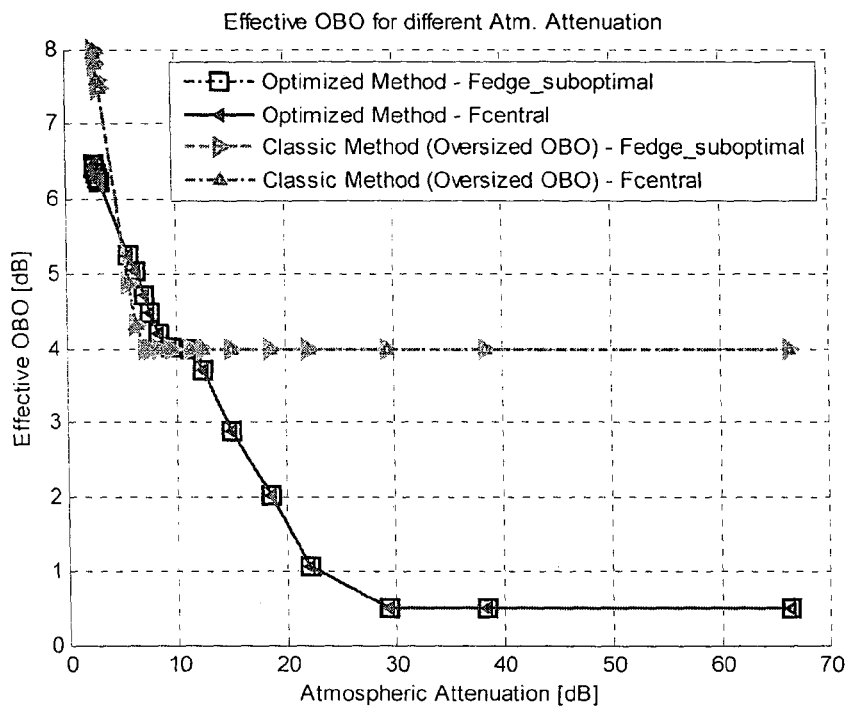

FIG. 15 shows the OBO versus the atmospheric attenuation for the cases of classic power control for the oversized OBO and the proposed interference aware optimized power control for Gateway 1.

Despite in clear sky the classic power control with oversized OBO operates at a higher OBO, it can be seen that up to 10 dB of attenuation the optimized interference aware technique operates with a larger Back Off. This means that the classic power control even in this condition will be impaired by an unnecessary high level of intermodulation noise.

Figure 16:
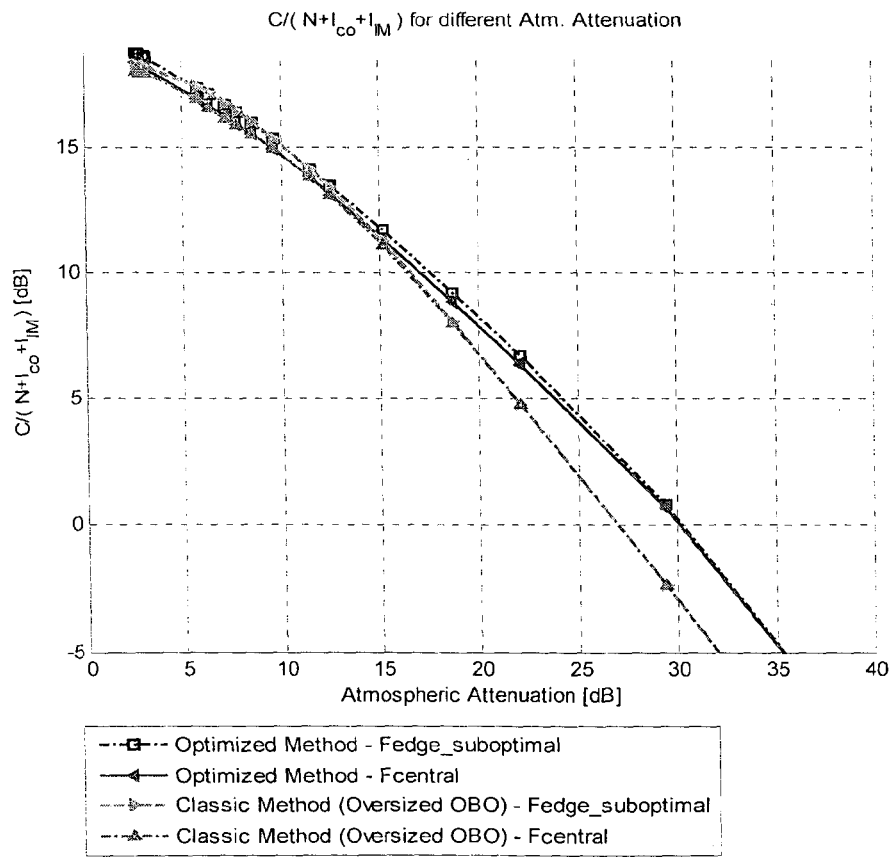

FIG. 16 shows the SNIR in the uplink for the two techniques. In this plot, the SNIR is shown for the central and edge carrier of the HPA. Comparing the classic method with the proposed one, we can observe gains in the order of 1-3 dB for attenuations higher than 15 dB.

Figure 17:
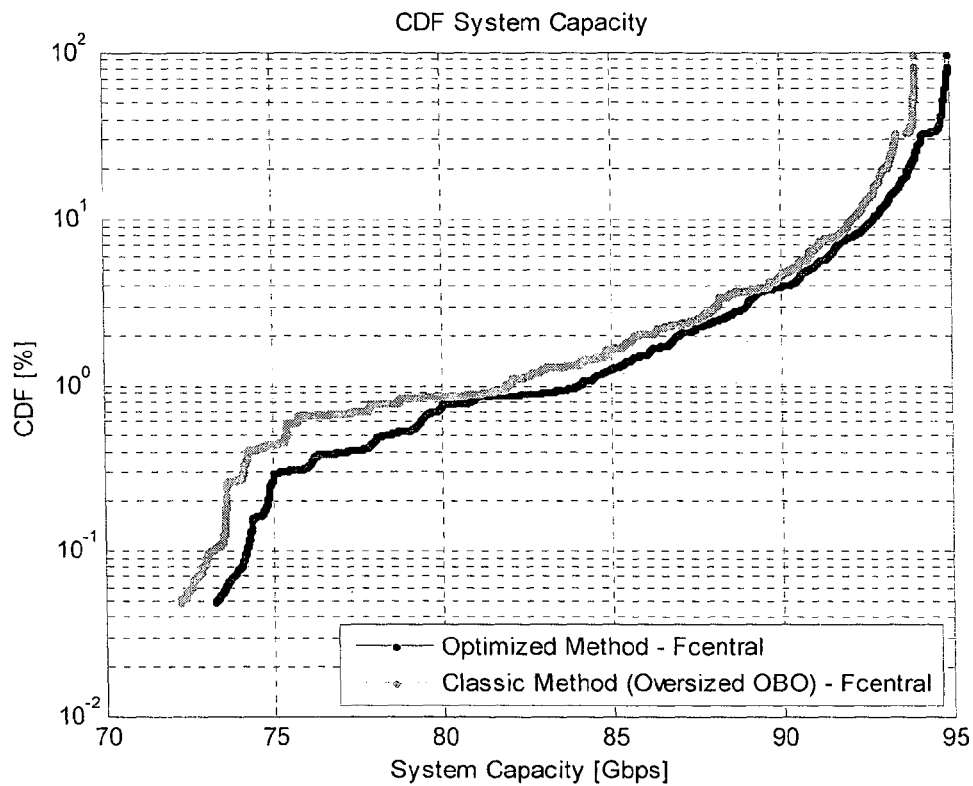

FIG. 17 shows the cumulative distribution function of the system capacity using the classic (light grey) method and the optimised one (dark grey) assuming that all the carriers are affected by the intermodulation level seen by the central carrier. It has to be noticed that oversizing the OBO in clear sky leads to a decrease in the system capacity in clear sky of some 3 Gbps (~3%), which is unacceptable to an operator.

Figure 18:
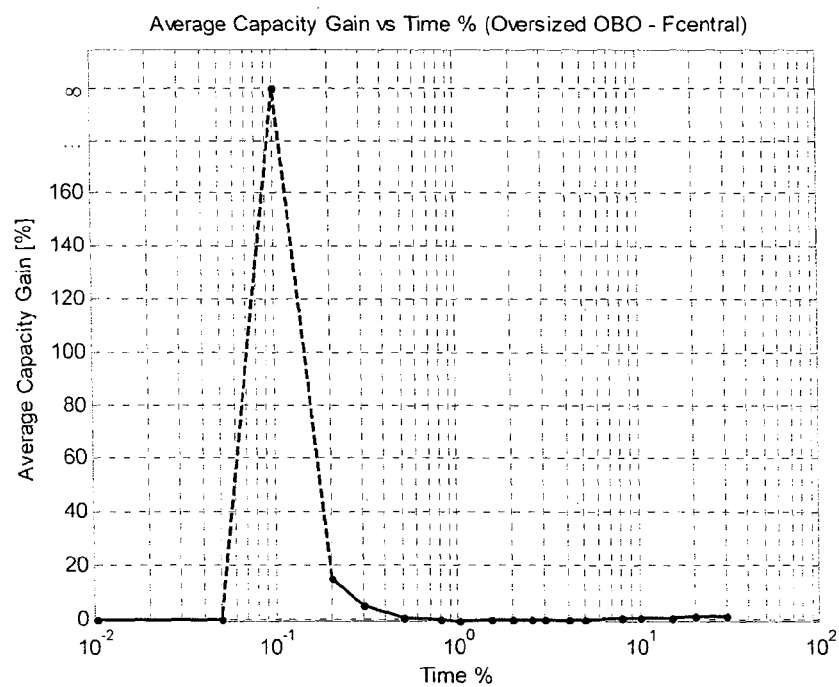

FIG. 18 shows the average capacity gain of the proposed technique versus the classic technique at different percentages of time for the central carrier; the results have been averaged over all gateways. It can be seen that at 0.1% time (that is, 99.9% availability where the feeder link must be sized) the proposed technique achieves a virtually infinite gain. In other words, the technique allows still closing the link in all gateways, whereas the link is unavailable (zero capacity) in some gateways when using the classic power control solution.

Case 1c

In this case, the gateway OBO is undersized and is set to 4 dB in clear sky. The results are shown in FIGS. 19-22.

Figure 19:
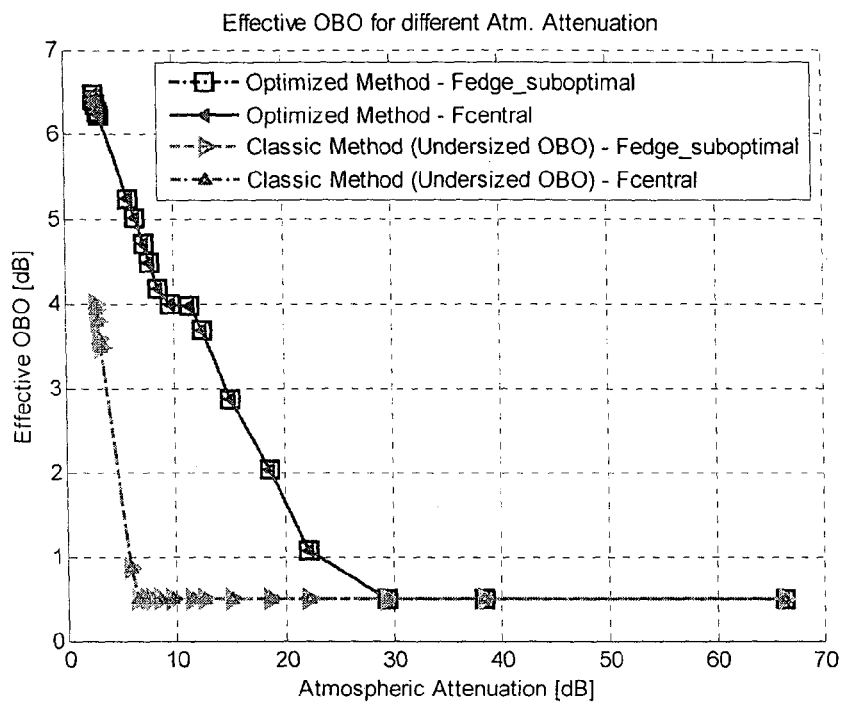

FIG. 19 shows the OBO versus the atmospheric attenuation for the classic and optimized method versus the uplink attenuation.

Figure 20:
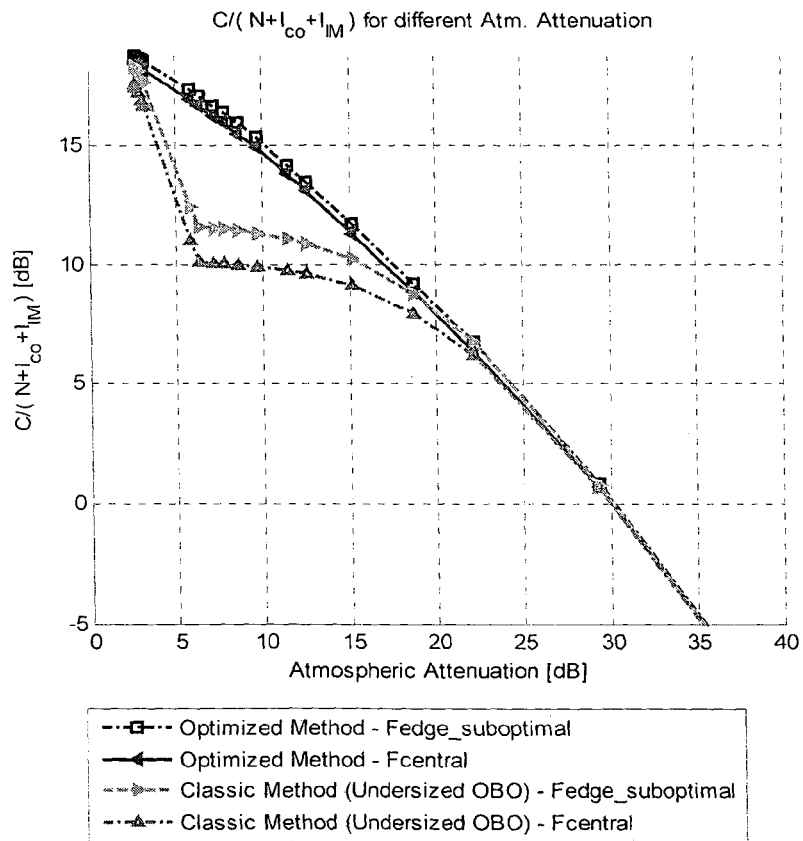

FIG. 20 shows the uplink SNIR for the optimized and classic method, for the central and edge carriers. In this case, the gain in SNIR is in the order of 8 dB for attenuations in the order of 5 dB. The gain remains remarkable up to an attenuation of 15 dB.

Figure 21:
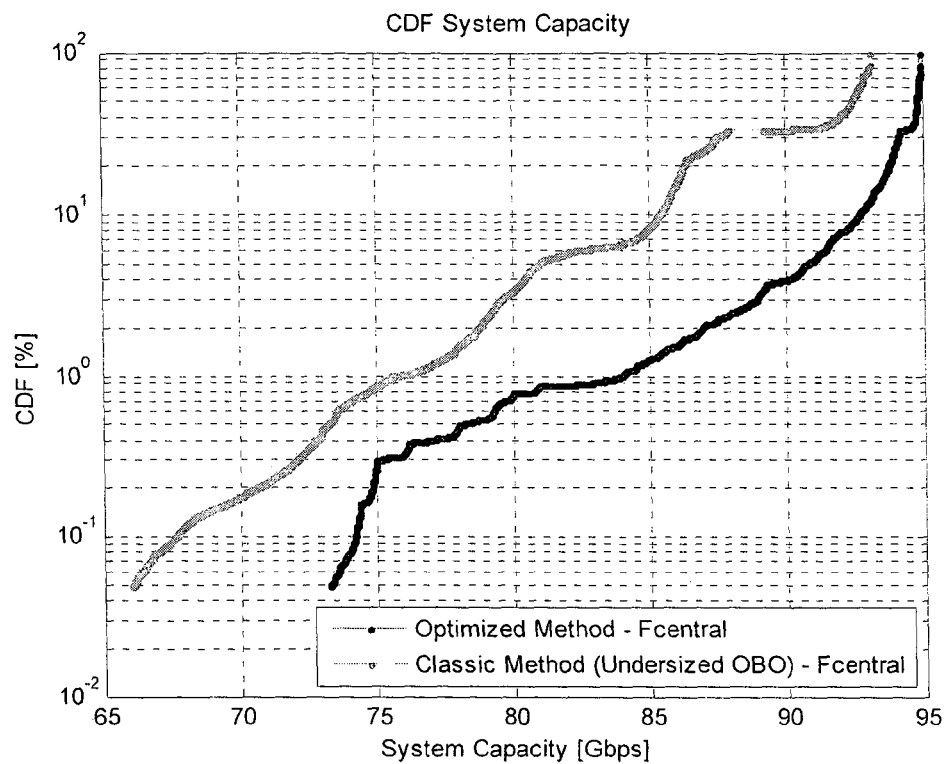

FIG. 21 shows the comparison of the system capacity CDF for the two techniques (light gray: classic method; dark grey: inventive method). As for the previous case, the system capacity of the optimized technique is always better than the classic one. Differently from the oversized OBO, in clear sky the classic method loses capacity due to the limiting effect of the intermodulation, whereas in the previous case the link became noise-limited due to the high Back off used.

Figure 22:
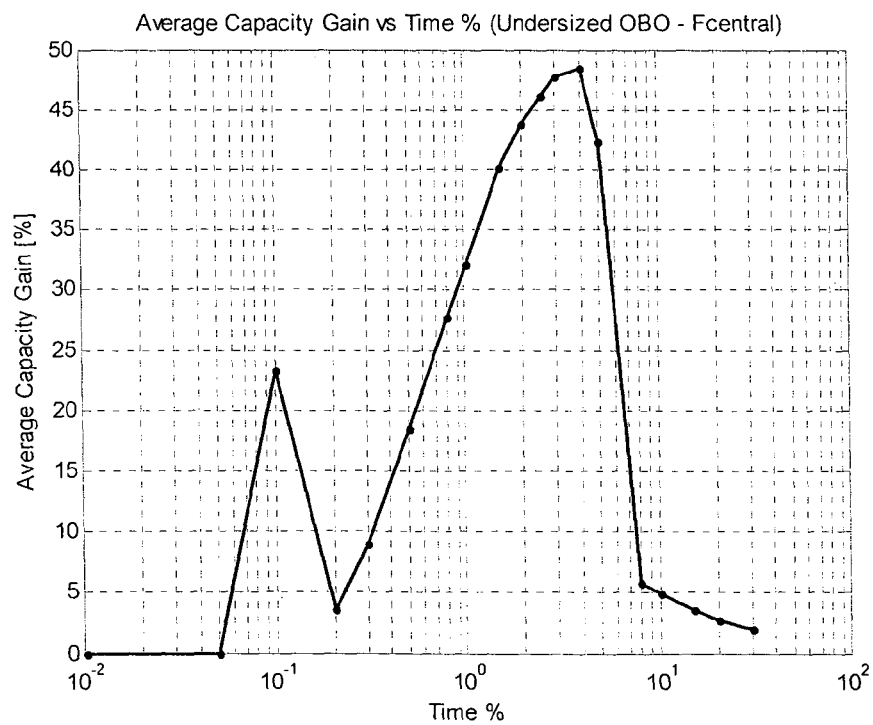

FIG. 22 shows the average capacity gain at the central frequency for different time percentages over the entire set of gateways. The gain is up to 50% for time percentages of 5%.

Case 2a

Case 2a considers small gateways and the same OBO limits as the optimized technique OBO. It is recalled here that in this case the system design strategy is to reduce the single gateway dimensioning, but introducing some "smart" diversity having N nominal gateways plus P redundant gateways able to replace any of the N nominal in case of fading.

In this case, the two power control techniques are compared assessing the required number of redundant gateways to meet a feeder link availability of 99.9%, where the feeder availability is defined as the capability of the feeder of supporting 80% of the clear sky capacity.

The results are shown in FIGS. 23-27.

Figure 23:
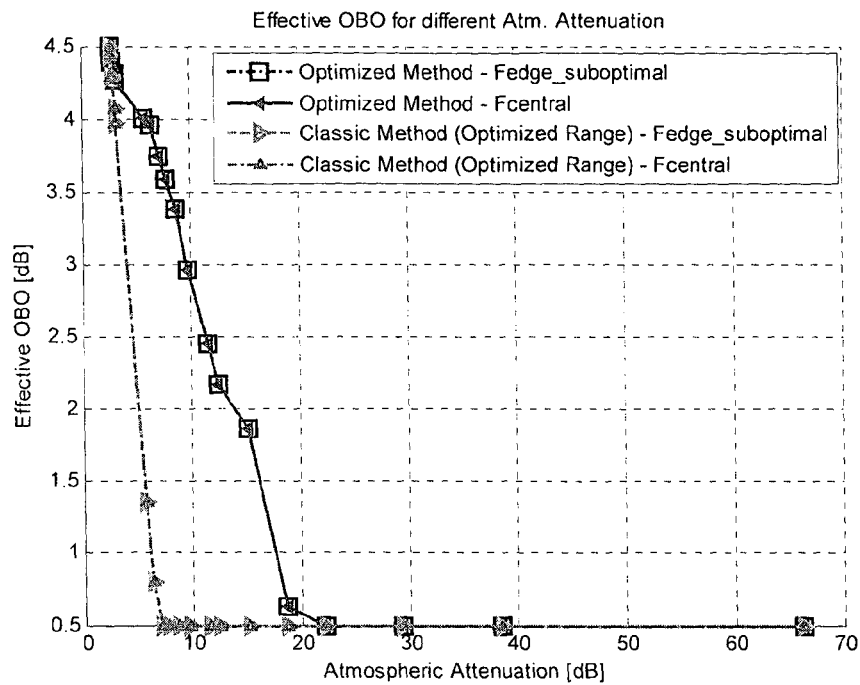
FIG. 23 to FIG. 38, curves comparing the performances of a first embodiment of said exemplary system when implementing an Uplink Power Control method according to the invention and a method according the prior art.

FIG. 23 shows the OBO versus the atmospheric attenuation for the classic and optimized method versus the uplink attenuation.

Figure 24:
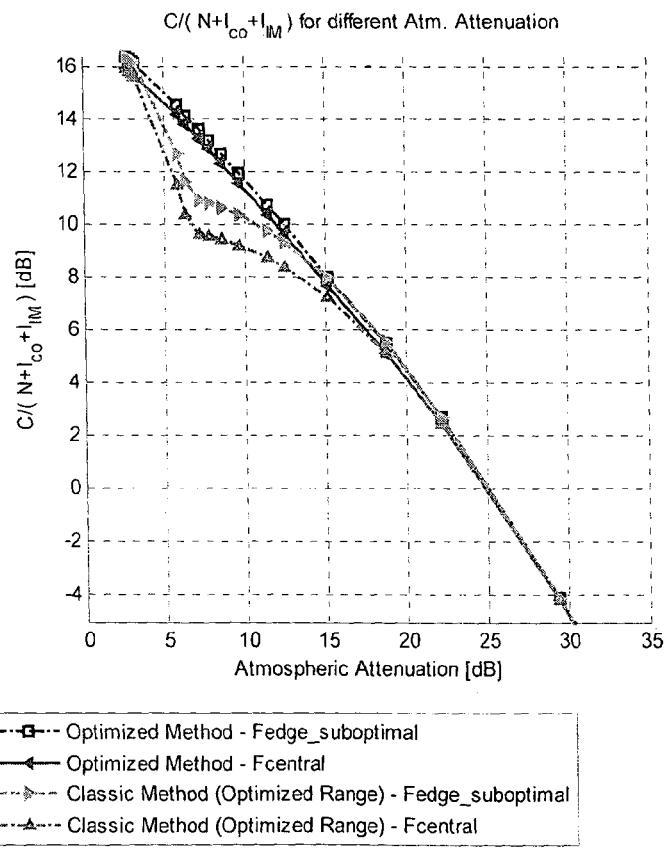

FIG. 24 shows the uplink SNIR for the optimized and classic method, for the central and edge carriers. In this case, the gain in SNIR is in the order of 3-4 dB for attenuations in the order of 5-10 dB.

Figure 25:
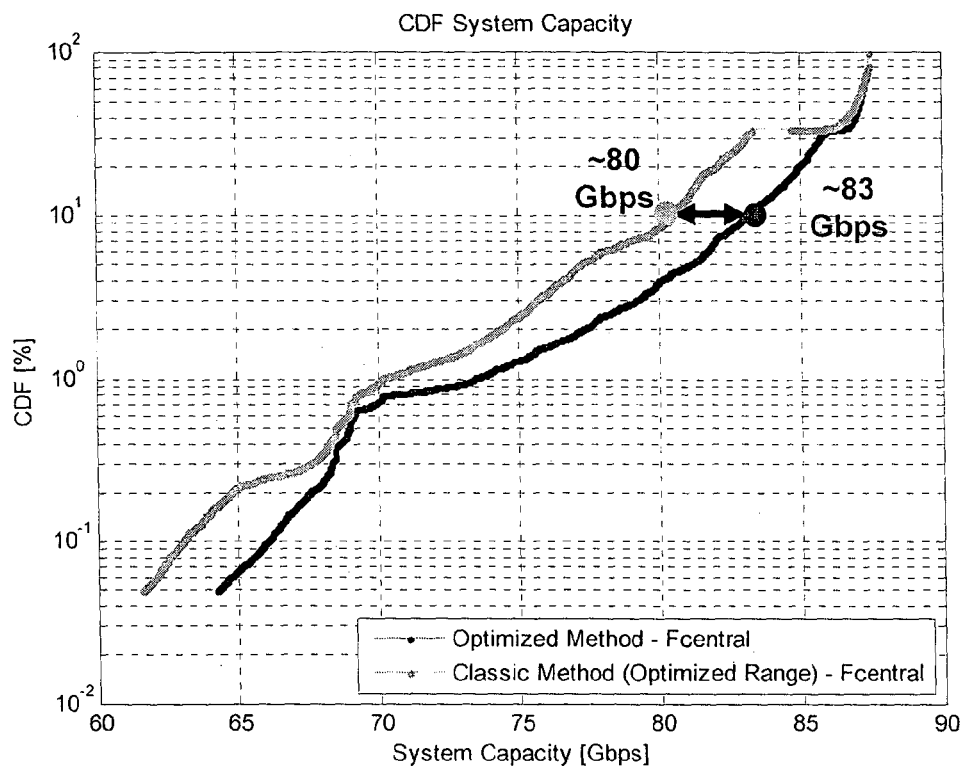

FIG. 25 shows the comparison of the system capacity CDF for the two techniques (light gray: classic method; dark grey: inventive method). The capacity is the same in clear sky, while the classic power control imply a loss of 2-3 Gbps in the system capacity for high percentages of time (as shown in the picture, for 10% of the time the capacity grows from 80 Gbps for the classic method to 83 Gbps with the optimization).

Figure 26:
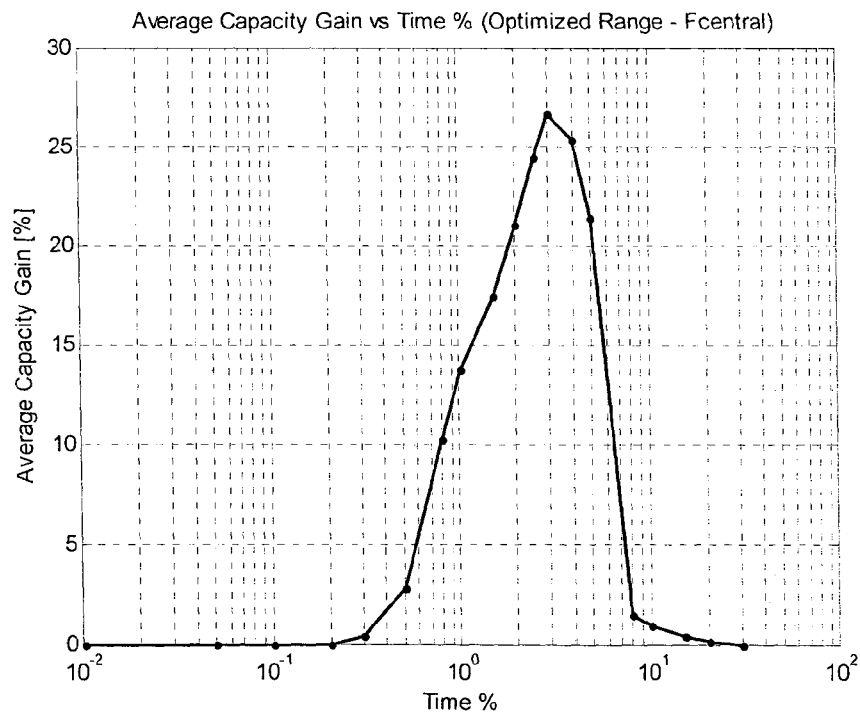

FIG. 26 shows the average capacity gain at the central frequency for different time percentages over all gateways. The gain is up to 25% for time percentages of 3%.

Figure 27:
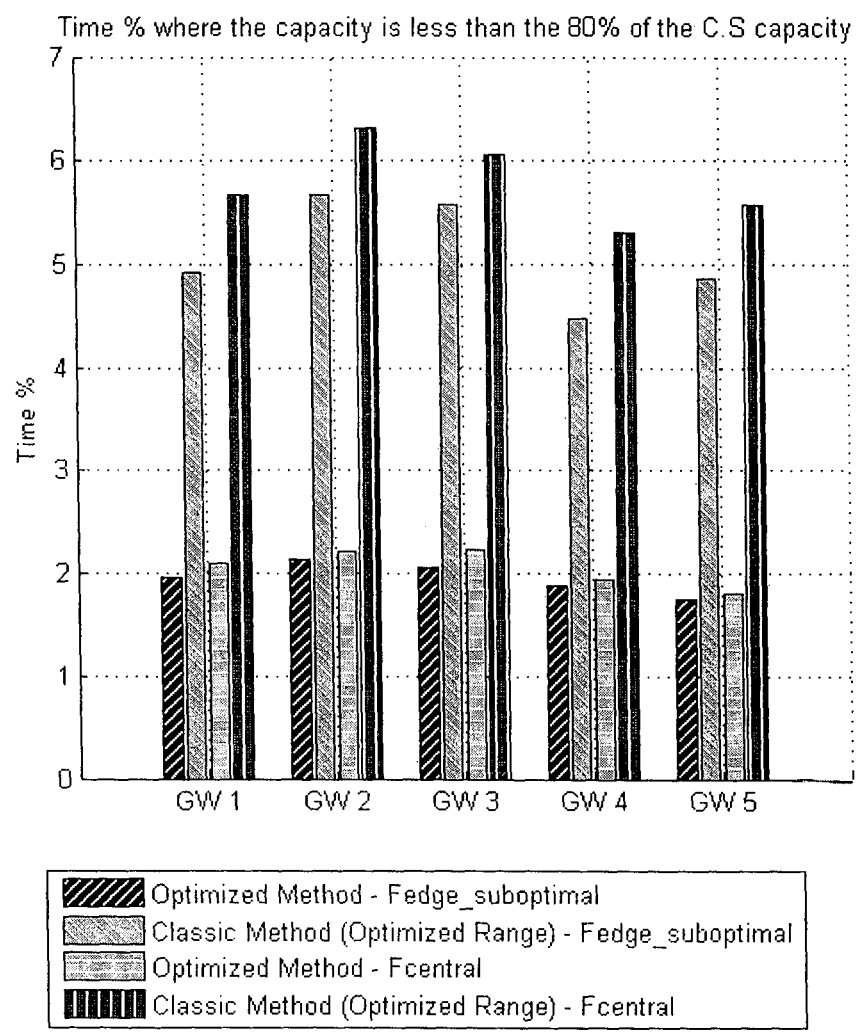

The most significant result is shown in FIG. 27, showing the percentage of time when the system capacity is less than 80% of the nominal clear sky capacity. It is worth mentioning that results differ for the edge and central carrier, but the feeder should be sized for the worst carrier, that is the central one. As a consequence, it can be noticed that the single link unavailability achievable is around 6% and 2% for the classic and optimized methods respectively.

Figure 38:
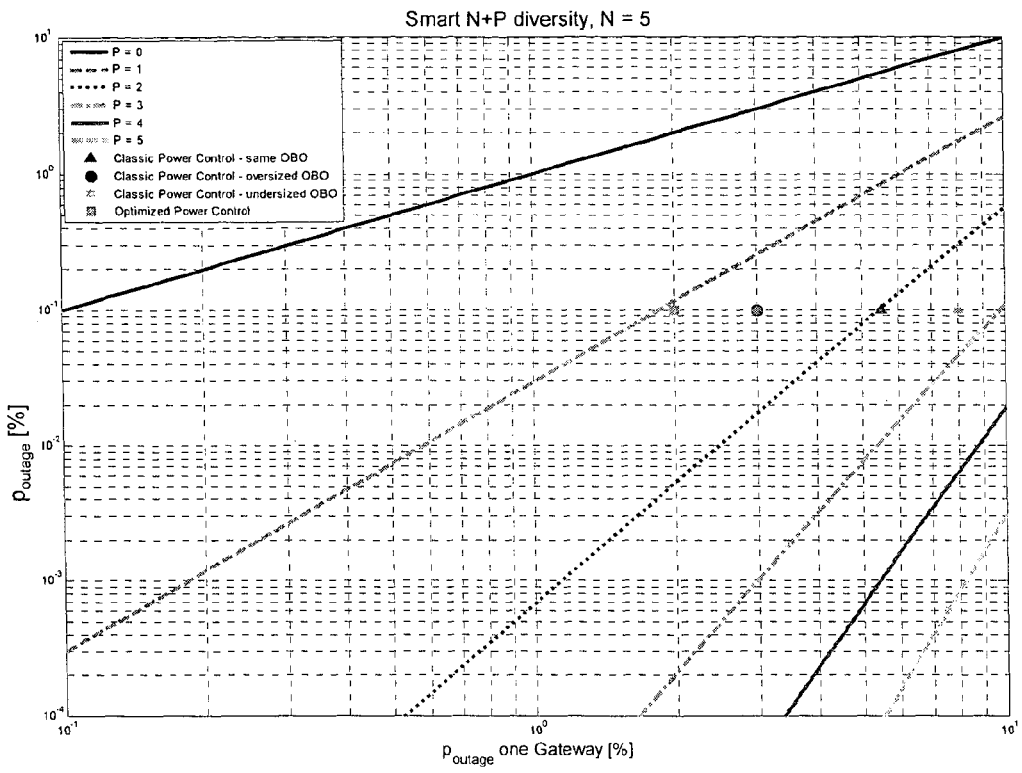

FIG. 38 is used to determine the number of redundant gateways needed to satisfy the quality of service requirements. In particular, the different curves show the system level outage as a function of the outage of the single gateway, for different numbers of redundant gateways. The outage $P_{outage}$ in this plot is defined as the percentage of time when the capacity of the gateway is less than 80% of the nominal capacity due to atmospheric phenomena.

On the plot there are also shown the points representing the performance of the different power control techniques in the different test cases. The picture shows that the system requirement on the outage translates in the need of 1 redundant gateway in addition to the 5 nominal ones for the optimized technique versus the 2 redundant required by the classic technique. This translates in a saving of around 15% on the ground segment CAPEX (CAPital Expenditures) and OPEX (OPerational EXpenditures).

Case 2b

Case 2b considers small gateways and oversized OBO. The results are shown in FIGS. 28-32.

Figure 28:
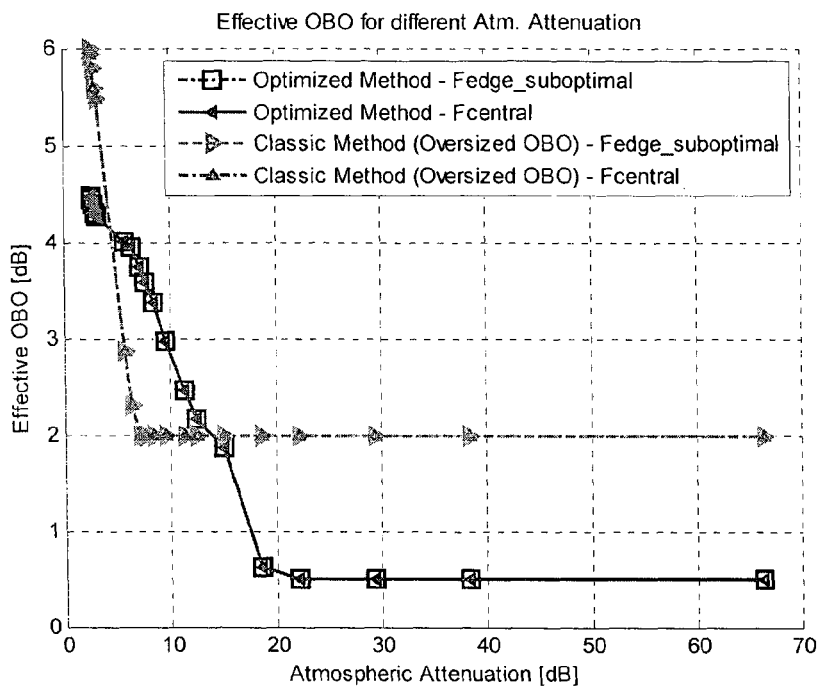

FIG. 28 shows the OBO versus the atmospheric attenuation for the classic and optimized method versus the uplink attenuation.

Figure 29:
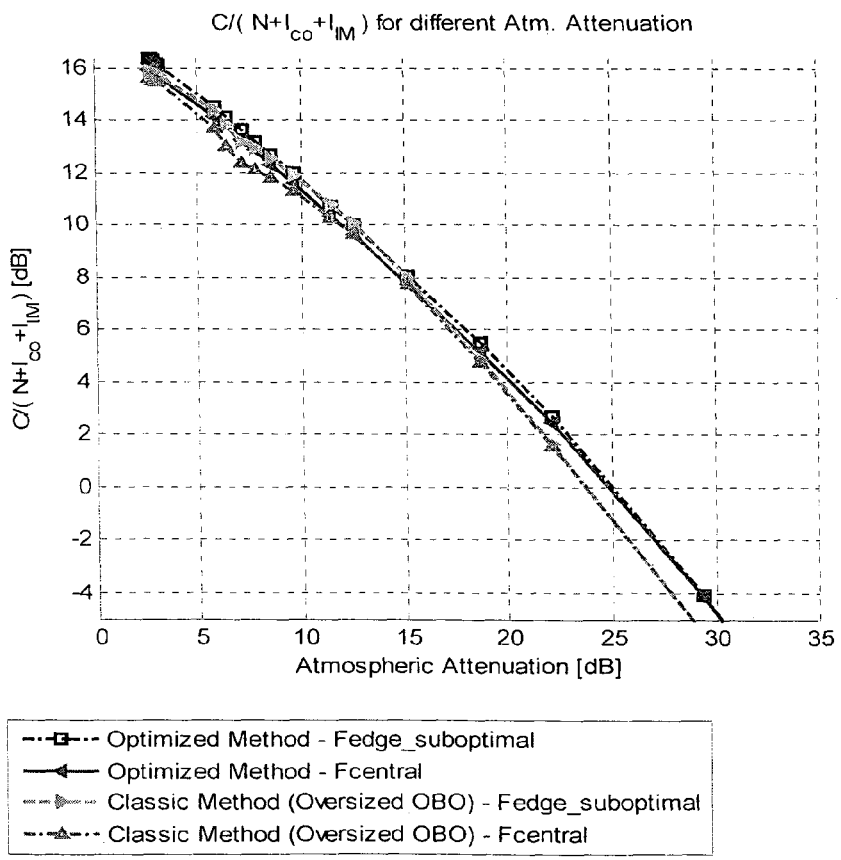

FIG. 29 shows the uplink SNIR for the optimized and classic method, for the central and edge carriers. In this case, the gain in SNIR is in the order of 1 dB for attenuations in the order of 5-10 dB.

Figure 30:
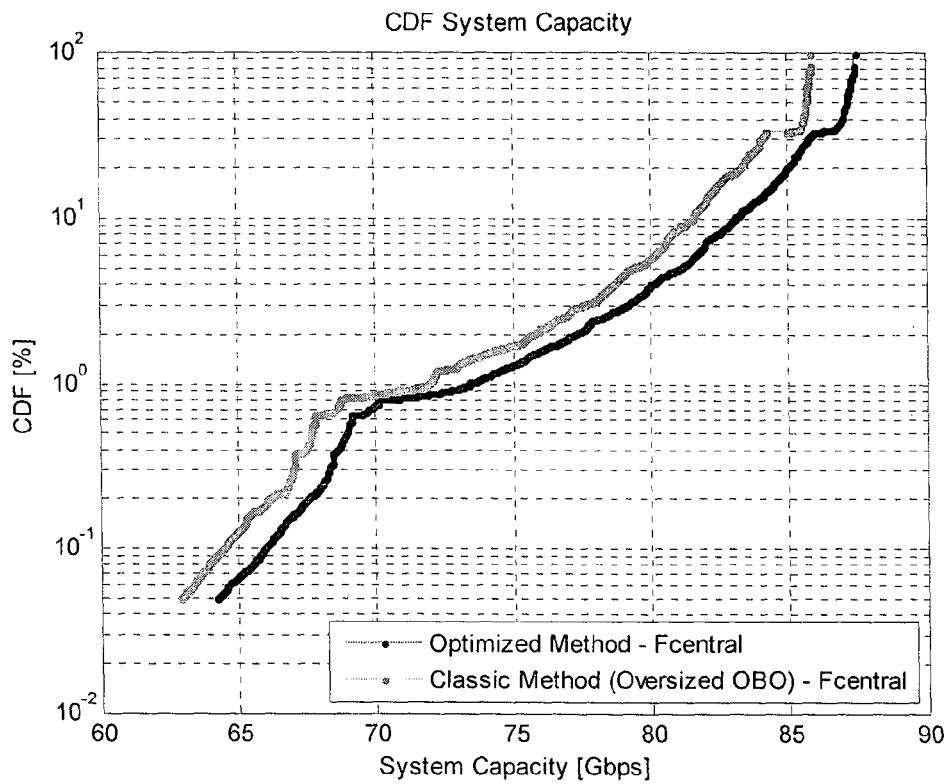

FIG. 30 shows the comparison of the system capacity CDF for the two techniques (light gray: classic method; dark grey: inventive method). It can be seen that oversizing the OBO in clear sky implies a remarkable loss of around 2 Gbps (~2.5%) in the clear sky capacity.

Figure 31:
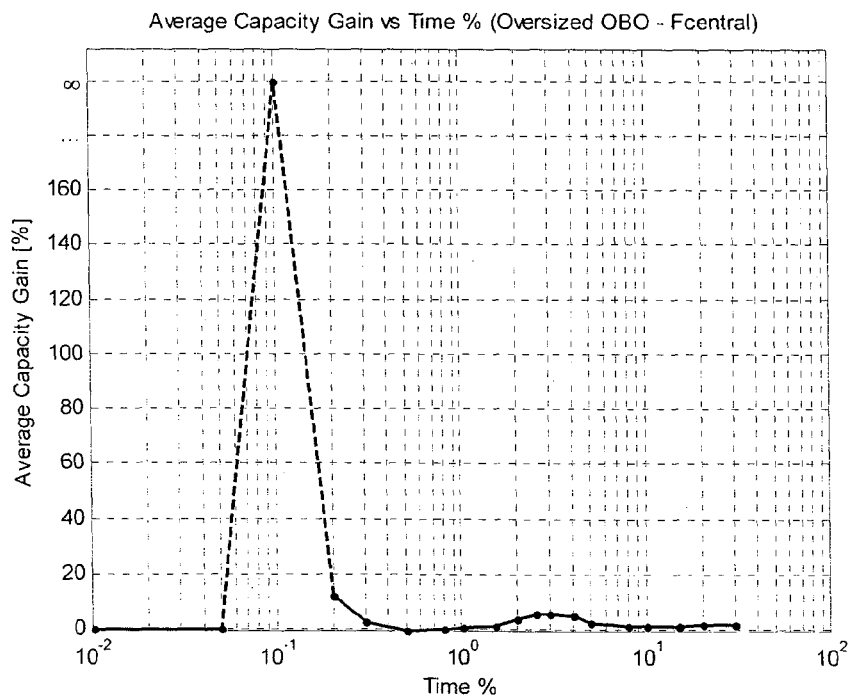

FIG. 31 shows the average, over all gateways, capacity gain at the central frequency for different time percentages. It can be seen that at 0.1% time (that is, 99.9% availability where the feeder link must be sized) the proposed technique achieves a virtually infinite gain. In other words, the technique allows still closing the link in all gateways, whereas the link is unavailable (zero capacity) in some gateways when using the classic power control solution.

Figure 32:
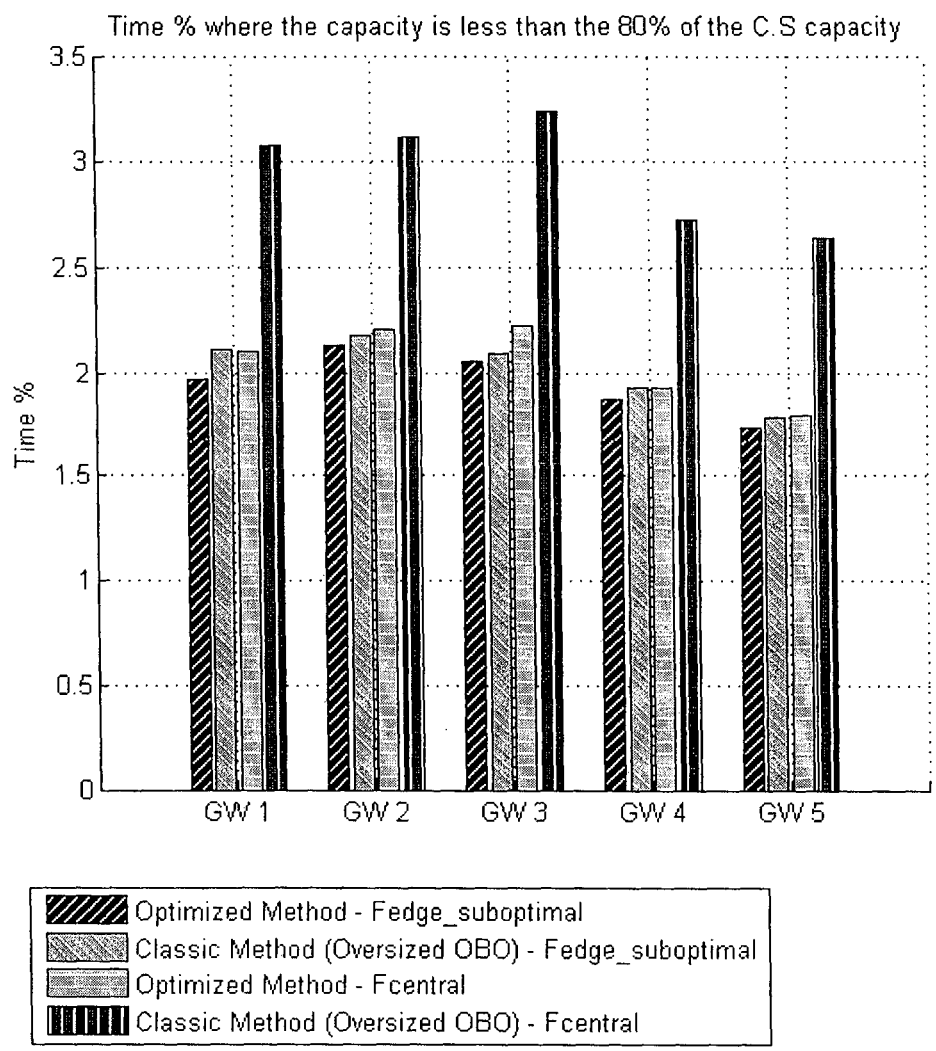

FIG. 32 shows the percentage of time when the system capacity is less than 80% of the nominal clear sky capacity, comparing the two techniques, for gateways GW1-GW5. It can be derived that the single link unavailability achievable is around 3% and 2% for the classic and optimized methods respectively.

As shown in FIG. 38, this translates in the need of 1 redundant gateway in addition to the 5 nominal ones for the optimized technique versus the 2 redundant required by the classic technique. This translates in a saving of around 15% on the ground segment CAPEX and OPEX.

Case 2c

Case 2c considers small gateways and undersized OBO. The results are shown in FIGS. 33-37.

Figure 33:
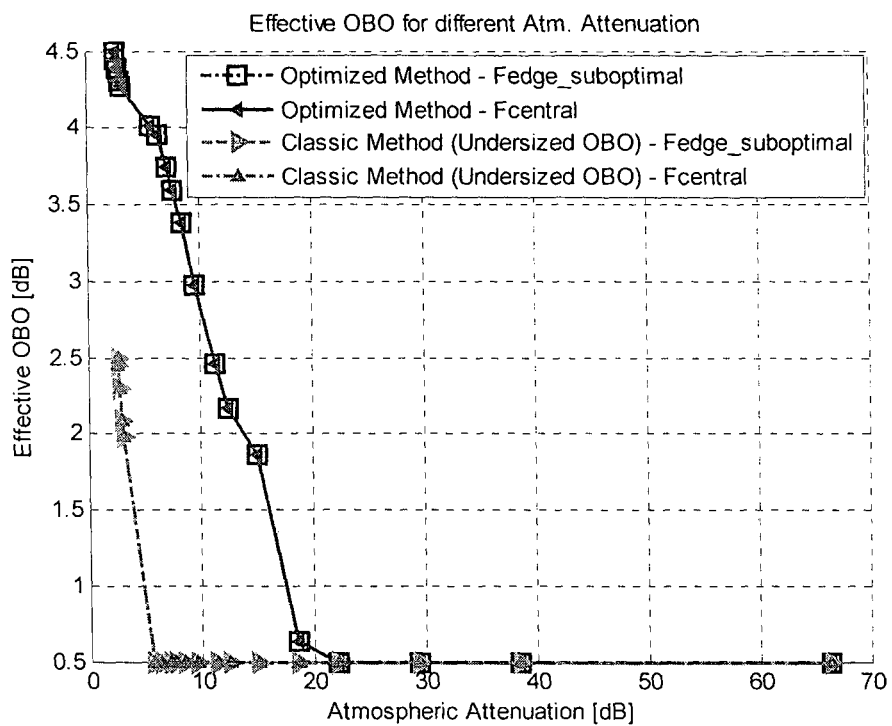

FIG. 33 shows the OBO versus the atmospheric attenuation for the classic and optimized method versus the uplink attenuation.

Figure 34:
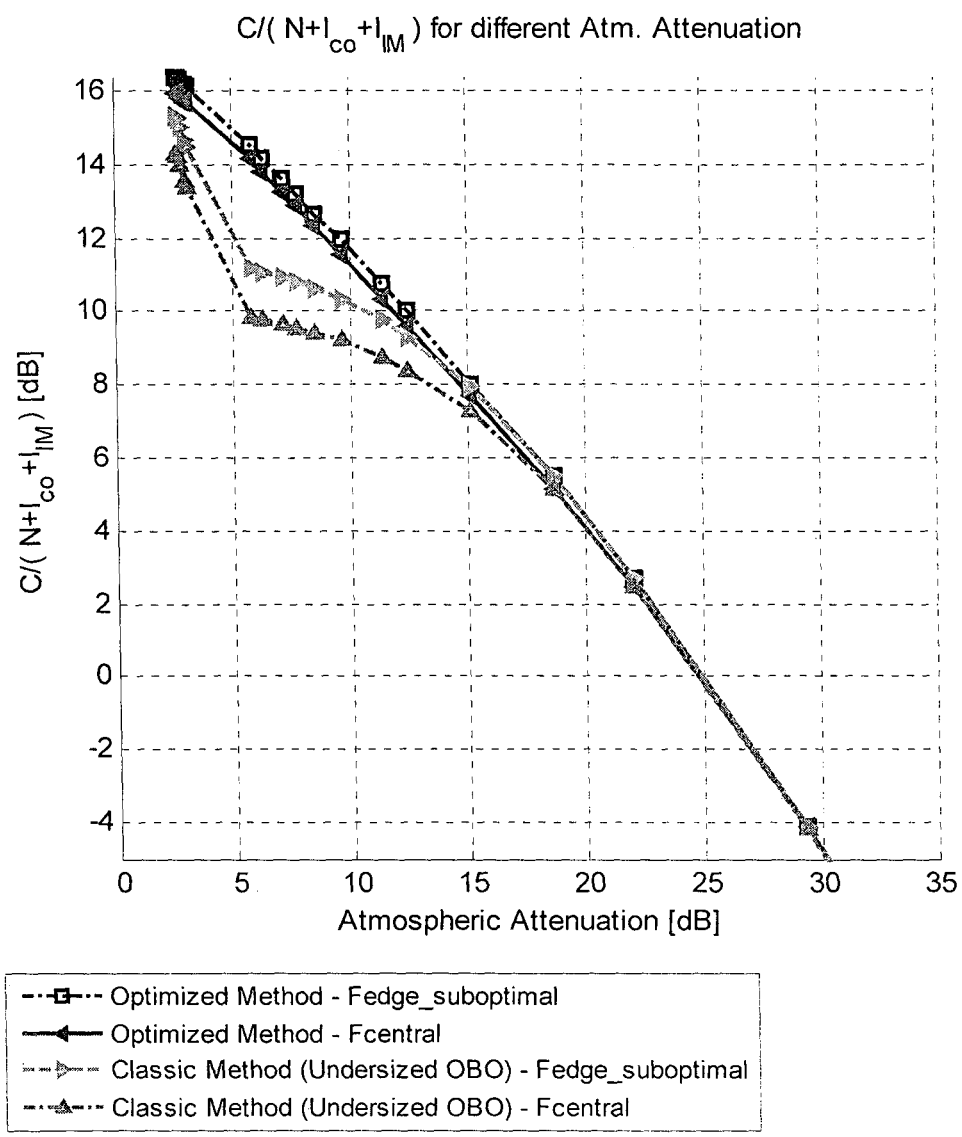

FIG. 34 shows the uplink SNIR for the optimized and classic method, for the central and edge carriers. In this case, the gain in SNIR is in the order of 4 dB for attenuations in the order of 5-10 dB.

Figure 35:
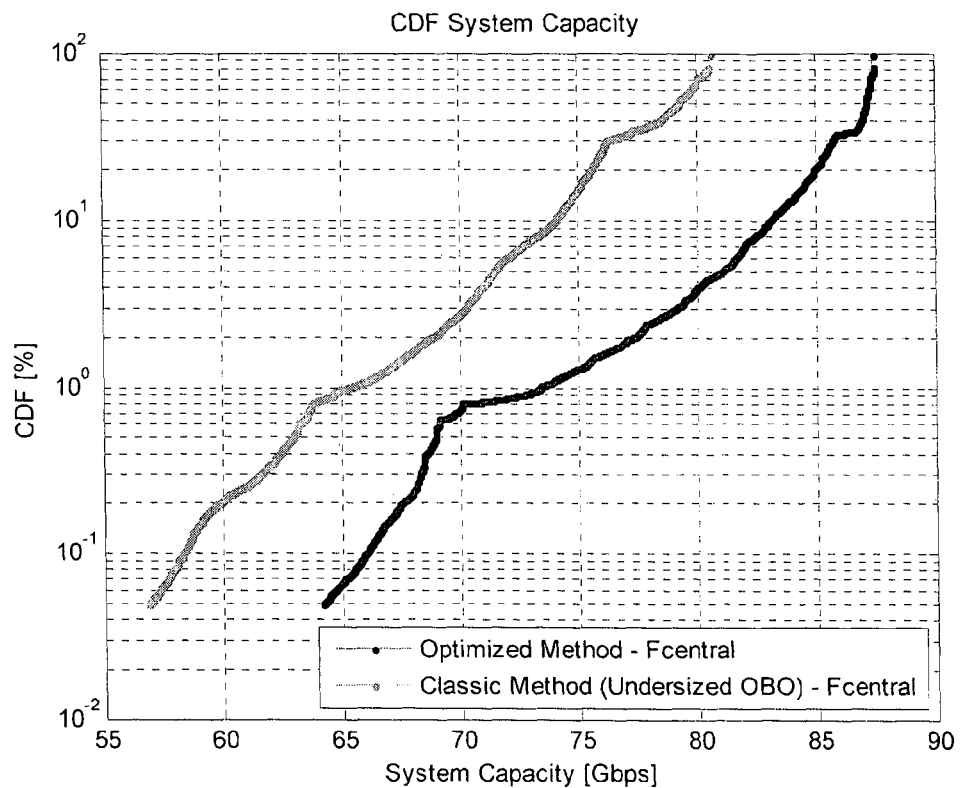

FIG. 35 shows the comparison of the system capacity CDF for the two techniques. It can be seen that undersizing the OBO in clear sky implies a remarkable loss of around 7.5 Gbps (~10%) in the clear sky capacity due to the increase in the intermodulation noise.

Figure 36:
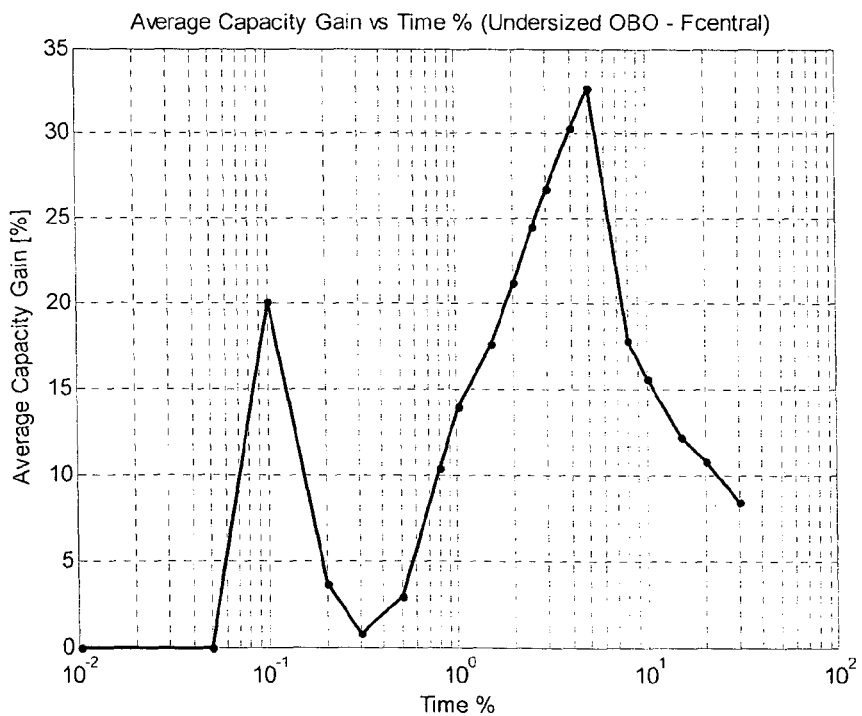

FIG. 36 shows the average capacity gain over all gateways for different time percentages. The gain is up to 35% for time percentages of 5%.

Figure 37:
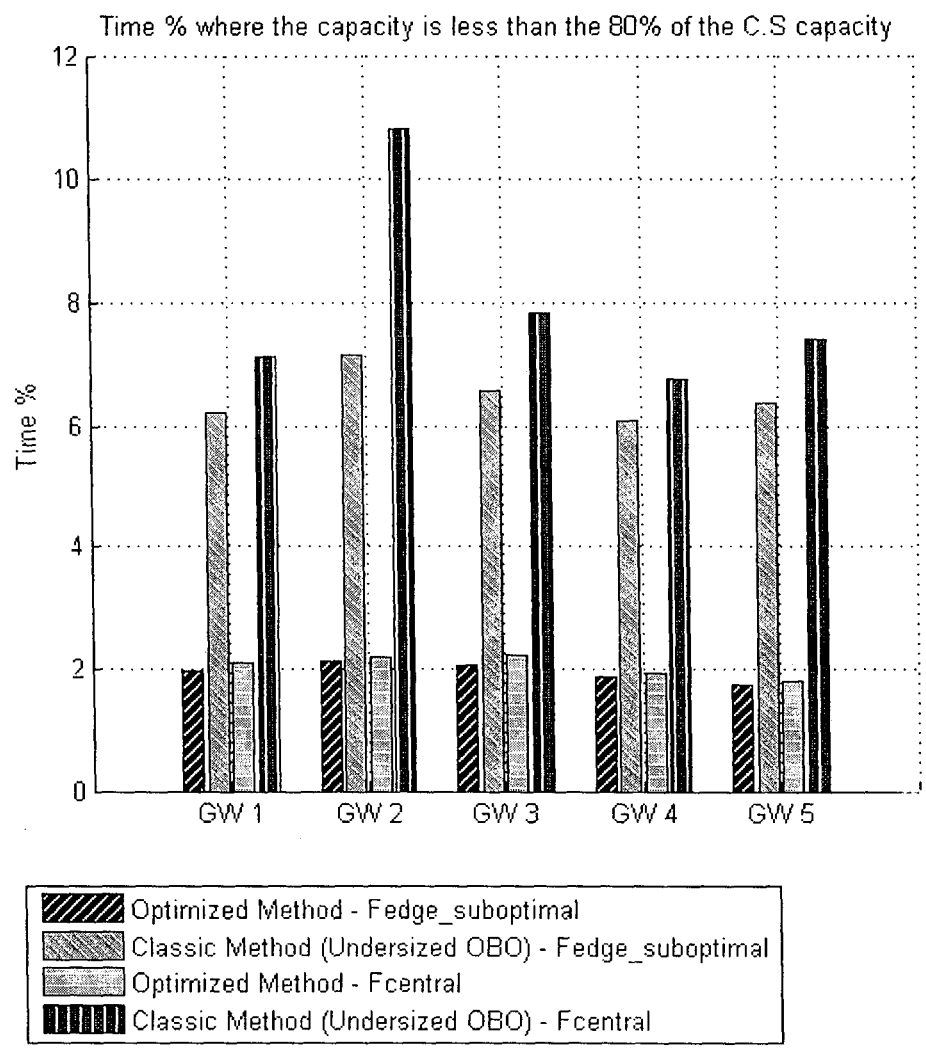

FIG. 37 shows the percentage of time when the system capacity is less than 80% of the nominal clear sky capacity, comparing the two techniques. It can be derived that the single link unavailability achievable is around 7% and 2% for the classic and optimized methods respectively.

As shown in FIG. 38, this translates in the need of 1 redundant gateway in addition to the 5 nominal ones for the optimized technique versus the 3 redundant required by the classic technique. This translates in a saving of around 30% on the ground segment CAPEX and OPEX. It is stressed here that the gain achievable by the technique is highly system-dependant. As explained, the results shown here refer to a high capacity broadband consumer system with an extremely high number of beams. As a consequence, the user link is characterised by a fairly low SNIR, therefore the spectral efficiency is highly conditioned by the user link, and the feeder link plays only a marginal role. Every system with a higher performance in the user link would benefit more by the introduction of this technique.

As an instance, professional point-to-point communication systems implemented via meshed satellite networks are characterized by a closer performance of uplink and downlink. Therefore, the gain in dB of the SNIR will directly be translated in a gain in spectral efficiency, thus inducing a much higher capacity gain.

Until now, a perfect estimation at the gateway side of the cochannel interference, intermodulation products of the Gateway HPA and C/N has been assumed.

In practical implementations, the actual estimation of these parameters can be done using open or closed loop estimators. Several estimation techniques are known from the prior art; in particular, propagation attenuation can be estimated dynamically with the help of a beacon transmitted by the satellite ([RD 12]), while the effect of noise and interferences can be obtained through calibration.

It is important to assess the sensitivity of the proposed technique to estimation errors, which can be significant.

The estimation errors are heavily dependent on the estimation technique used, and in case some a priori knowledge of some equipment characteristics is required, also on the quality of the calibration.

The sensitivity of the proposed technique has been evaluated pragmatically inserting some error in the estimations. The following errors were assumed:

C/N estimation error: −2 dB $C/I_{co-channel}$ estimation error: −2 dB

C/Im estimation error: 0.5 dB

Attenuation estimation error: 10%.

The parameter bias direction (negative or positive) was chosen to generate a worst case, forcing the optimization to push the operation of the HPA towards lower OBO than requested. This cause a degradation of the performance of the technique since the effect of the intermodulation is underestimated by the optimizer.

Figure 40:
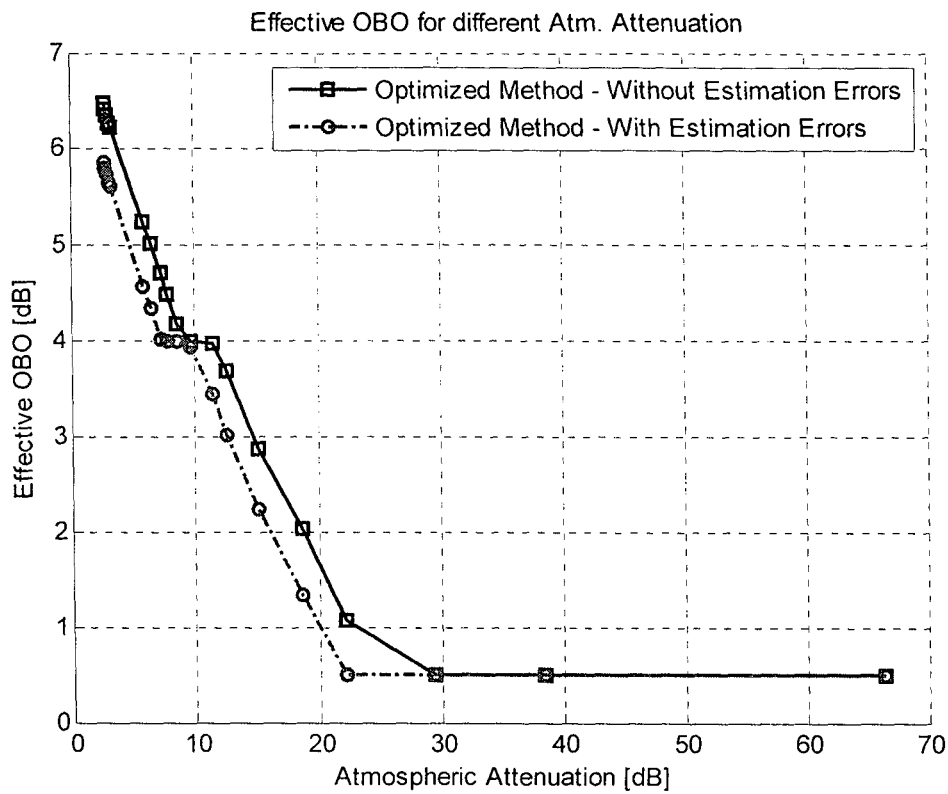
FIG. 40 to FIG. 42, curves illustrating the sensibility of an embodiment of the inventive method to errors in estimating the propagation attenuation.

FIG. 40 shows the optimal OBO computed using the inventive ("optimized") power control technique with and without estimation errors for the "large Gateways" case.

Figure 41:
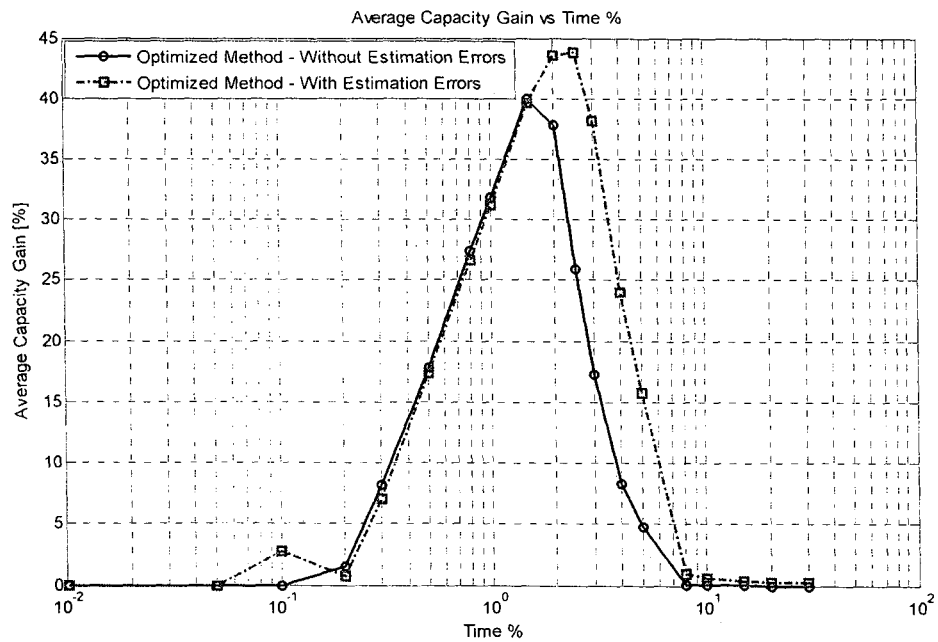

FIG. 41 shows the resulting performance in terms of average capacity gain of the inventive technique with and without estimation errors compared to the classic approach (with the "fair comparison" approach). It has to be noted that the same estimation errors are applied to the classic and the inventive techniques to have a comparison of the robustness to this error.

As a matter of fact, the technique is proven to be more robust to estimation errors when compared to the classic power control technique, as the gain compared to the classic pragmatic method are higher when estimation errors are considered.

Figure 42:
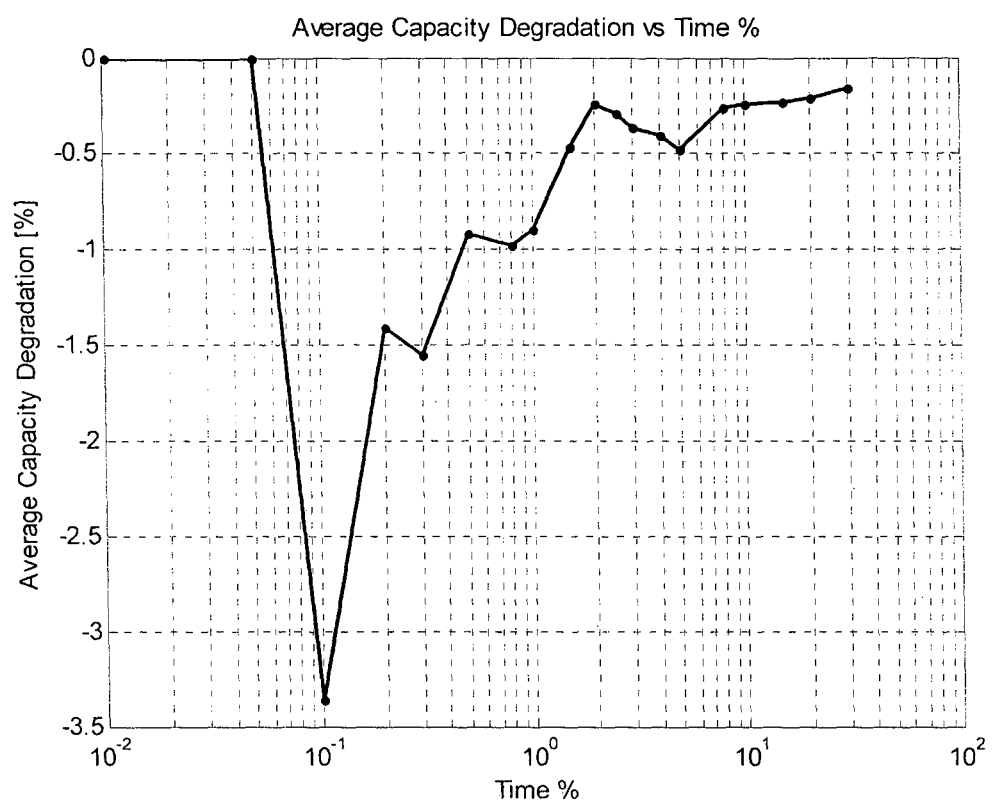

FIG. 42 finally shows the performance in terms of average capacity degradation due to the estimation errors compared to the optimized technique with perfect estimation. It can be seen that despite the fairly high errors introduced, the degradation is limited to 3.5% in the worst case.

LIST OF SYMBOLS

A Excess Atmospheric Attenuation $$\frac{C}{I_{cochannel}}$$

Carrier over Cochannel Interference ratio $$\frac{C}{N}$$

Carrier over noise ratio $$\frac{C}{I_{im}}$$

Carrier over Intermodulation Interference ratio
$EIRP_{SAT}$ Saturated Effective Isotropic Radiated Power
$G_{sat\_copolar}$ Satellite antenna co-polar gain
$G_{sat\_crosspolar}$ Satellite antenna cross-polar gain
GHz Giga Hertz
HPA High Power Amplifier
IBO Input Back-Off
$L_{FS}$ Free Space Losses
$L_{Polarization}$ Polarization Losses
$L_{prop}$ Total Propagation Losses
NPR Noise Power Ratio
OBO Output Back-Off
$ULPC_{range}$ Uplink Power Control Range
$N_{carriers}$ Number of carriers
RX_G Satellite Reception Antenna Gain
k Boltzmann's constant
T Satellite Receiver Noise Temperature
$R_{symb}$ Symbol rate
SNIR Signal-to-Noise plus Interference Ratio
SNR Signal-to-Noise Ratio
XPD Cross-Polar Discrimination (Atmosphere)
XPI Cross-Polar Isolation (Gateway Antenna)

REFERENCES

[RD 1] D. Mignolo, E. Re, A. Ginesi, A. B. Alamanac, P. Angeletti, M. Halverson, "Approaching Terabits satellite: a system analysis", 2011 Ka-band Conference, Palermo, Italy.
[RD 2] ITU-R P.618-10 (10/09), Propagation data and prediction methods required for the design of Earth-space telecommunication systems.
[RD 3] Lyons, R.; "A Statistical Analysis of Transmit Power Control to Compensate Up- and Down-Link Fading in an FDMA Satellite Communications System", Communications, IEEE Transactions on Volume: 24, Issue: 6 Digital Object Identifier: 10.1109/TCOM.1976.1093346 Publication Year: 1976, Page(s): 622-636.
[RD 4] Leslie D. Thomas, "Power control on satellite uplinks", U.S. Pat. No. 4,038,699, Issue date: Jul. 26, 1977.
[RD 5] Takurou Muratani et al, "Transmission power control system in a satellite communication", U.S. Pat. No. 4,731,866, Issue date: Mar. 15, 1988.
[RD 6] Thomas J. Saam, "Uplink power control mechanism for maintaining constant output power from satellite transponder", U.S. Pat. No. 4,941,199, Issue date: Jul. 10, 1990.
[RD 7] Donald C. Mead, "Adaptive power control and coding for satellite communications", EU patent number EP0772317, May 7, 1997.
[RD 8] Jens Andenæs, "Satellite uplink power control", U.S. Pat. No. 7,043,200, Issue date: May 9, 2006.
[RD 9] Anil K. Agarwal et al, "Method for uplink power control for distributed satellite networks to compensate for rain fade", Publication number: U.S. Pat. No. 7,925,211 B2, Filing date: Apr. 23, 2009.
[RD 10] L. Castenet, A. Bolea-Almanac, M. Bousquet, "Interference and fade mitigation techniques for Ka and Q/V band satellite communication systems", International Workshop Satellite Communications from Fade Mitigation to Service Provision, Noordwijk, The Netherlands, May 2003.
[RD 11] Leonard N. Schiff, "Reducing service outages in a multibeam satellite system", U.S. Pat. No. 7,599,657 B2, Issue date: Oct. 6, 2009.
[RD 12] Herman A. Bustamante et al, "Power control system for satellite communications", U.S. Pat. No. 4,752,967, Issue date: Jun. 21, 1988.

The invention claimed is:

1. An Uplink Power Control method comprising adjusting an operating point of a High-Power Amplifier of a ground-to-satellite emitter as a function of propagation attenuation, wherein the method comprises the steps of:
  a) determining an optimal Output Back Off value of said High-Power Amplifier which, for an operational propagation attenuation level, maximizes a Signal over Noise plus total interference ratio at the satellite taking into account contributions from cochannel and cross-polar interferences, intermodulation interferences and thermal noise; and
  b) setting the operating point of the High-Power Amplifier at said optimal Output Back Off value.

2. An Uplink Power Control method according to claim 1, wherein said optimal Output Back Off value is determined by assuming that all the carriers amplified by said High-Power Amplifier are affected by a same level of intermodulation interferences, equal to that of a central carrier.

3. An Uplink Power Control method according to claim 1, wherein said optimal Output Back Off value is determined by maximizing a Signal over Noise plus total interference ratio averaged over all the carriers amplified by said High-Power Amplifier, each of them being affected by a respective level of intermodulation interferences.

4. An Uplink Power Control method according to claim 1, further comprising a preliminary step of computing Signal over Noise plus total interference ratios for a set of predetermined Output Back Off and propagation attenuation values, and wherein said step a) is performed by:
  a1) determining, among said predetermined propagation attenuation values, the one which best approximates said operational propagation attenuation level; and a2) choosing the predetermined Output Back Off value which, for the selected attenuation value, corresponds to the highest computed Signal over Noise plus total interference ratio.

5. An Uplink Power Control method according to claim 1, comprising a preliminary step of determining an approximated analytical expression for computing said Signal over Noise plus total interference as a function of Output Back Off and propagation attenuation, and wherein said step a) is performed by:
   a1') determining the current operational propagation attenuation level, and substituting it into said approximated analytical expression of Signal over Noise plus total interference ratio; and
   a2') determining said optimal Output Back Off value by maximizing said approximated analytical expressions of Signal over Noise plus total interference ratio using a numerical, analytical or hybrid numerical-analytical method.

6. An Uplink Power Control method according to claim 1, wherein said step a) of determining an optimal Output Back Off value is carried out under constraints imposing a maximal and minimal Output Back Off value, and a signal power at the satellite not exceeding a nominal level corresponding to clear sky conditions.

7. An Uplink Power Control method according to claim 1, comprising dynamical estimation of said operational propagation attenuation level.

8. An Uplink Power Control method according to claim 1, comprising a preliminary calibration step of estimating or measuring cochannel and cross-polar interference level, intermodulation interference level and thermal noise for a nominal propagation attenuation level.

9. An Uplink Power Control method according to claim 1, wherein said ground-to-satellite emitter is a gateway of a satellite network with star topology.

10. An Uplink Power Control method according to claim 1, wherein said ground-to-satellite emitter is a terminal of a satellite network with mesh topology.

11. A ground-to-satellite emitter comprising:
    a High-Power Amplifier; and
    control means for adjusting an operating point of said High-Power Amplifier by carrying out a method according to claim 1.

12. A ground-to-satellite emitter according to claim 11, wherein said control means comprises:
    a Variable Gain Amplifier, feeding said High-Power Amplifier with an input signal;
    a device for measuring the Output Back Off value of said High-Power Amplifier;
    a feedback loop for adjusting a gain value of said Variable Gain Amplifier as a function of a difference between the measured Output Back Off value and a target Output Back Off value; and
    a processor for computing said target Output Back Off value such that, for an operational propagation attenuation level, it maximizes a Signal over Noise plus total interference ratio taking into account contributions from cochannel and cross-polar interferences, intermodulation interferences and thermal noise.

13. A ground-to-satellite emitter according to claim 12, further comprising means for dynamically estimating said operational propagation attenuation level and providing it to said processor.

* * * * *